US011174081B2

(12) United States Patent
Tapocik

(10) Patent No.: US 11,174,081 B2
(45) Date of Patent: Nov. 16, 2021

(54) CHILD-RESISTANT LOCKING CAP FOR LAMINATED TUBES WITH IMPROVED LOCKING CAP INSERT TO REDUCE SUBSTANCE LEAKAGE AFTER THE LOCKING CAP IS CLOSED

(71) Applicant: Bryan Tapocik, Highland, CA (US)

(72) Inventor: Bryan Tapocik, Highland, CA (US)

(73) Assignee: Innovative Product Brands, Inc., Highland, CA (US)

( * ) Notice: Subject to any disclaimer, the term of this patent is extended or adjusted under 35 U.S.C. 154(b) by 125 days.

(21) Appl. No.: 16/773,868

(22) Filed: Jan. 27, 2020

(65) Prior Publication Data

US 2020/0156831 A1    May 21, 2020

Related U.S. Application Data

(63) Continuation-in-part of application No. 15/951,956, filed on Apr. 12, 2018, now Pat. No. 10,658,404.

(51) Int. Cl.
| | |
|---|---|
| *B43M 11/06* | (2006.01) |
| *B65D 50/04* | (2006.01) |
| *B65D 35/44* | (2006.01) |
| *B65D 35/10* | (2006.01) |
| *B65D 35/38* | (2006.01) |
| *B65D 1/02* | (2006.01) |

(52) U.S. Cl.
CPC .......... *B65D 50/041* (2013.01); *B65D 1/023* (2013.01); *B65D 35/10* (2013.01); *B65D 35/38* (2013.01); *B65D 35/44* (2013.01)

(58) Field of Classification Search
CPC ........ B65D 35/10; B65D 35/36; B65D 35/38; B65D 35/44; B65D 50/041; B65D 50/046; B65D 1/023; B65D 2215/04; B32B 15/20; B32B 27/08; B32B 27/30; B32B 27/32; B32B 3/30; B32B 15/016; B32B 2250/246; A45D 34/041; A45D 40/261
See application file for complete search history.

(56) References Cited

U.S. PATENT DOCUMENTS

| | | | | |
|---|---|---|---|---|
| 5,699,922 A | * | 12/1997 | Harding | ............. B65D 41/0478 215/201 |
| 6,036,036 A | * | 3/2000 | Bilani | .................. B65D 50/046 215/216 |
| 8,079,483 B2 | * | 12/2011 | Brozell | ............. B65D 41/0471 215/216 |

* cited by examiner

*Primary Examiner* — Jennifer C Chiang
(74) *Attorney, Agent, or Firm* — Minta Law Group LC

(57) ABSTRACT

A combination of a container made out of rolled laminated plastic or rolled laminated metal, combined with a child-resistant locking assembly between the container and a cap removably affixed to the container. The container includes a closed rear end, a front wall and a flexible sidewall between the closed rear end and the front. The cap includes a central post inserted into a dispensing opening in a dispensing nozzle of the contain to reduce the possibility of contents in the container seeping out of the dispensing nozzle after the sealing cap is affixed to the nozzle.

12 Claims, 29 Drawing Sheets

180,400 US 11,174,081 B2

CHILD-RESISTANT LOCKING CAP FOR LAMINATED TUBES WITH IMPROVED LOCKING CAP INSERT TO REDUCE SUBSTANCE LEAKAGE AFTER THE LOCKING CAP IS CLOSED

CROSS-REFERENCE TO RELATED APPLICATION

This patent application is a continuation-in-part of patent application Ser. No. 15/951,956 filed on Apr. 12, 2018, now pending, which was a continuation-in-part of parent patent application Ser. No. 15/396,725 filed on Jan. 2, 2017, now issued as U.S. Pat. No. 10,343,823.

BACKGROUND OF THE INVENTION

1. Field of the Invention

The field of the invention relates to the area of containers with contents that require security to prevent a child from opening the container.

2. Description of the Prior Art

The present inventor is not aware of any prior art relating to his invention.

SUMMARY OF THE INVENTION

The present invention is a combination of a container made out of rolled laminated plastic or rolled laminated metal combined with a rollerball applicator, combined with a child-resistant locking assembly between the container and a cap removably affixed to the container The container includes a closed rear end, a front wall and a flexible sidewall between the closed rear end and the front wall. The flexible sidewall is in a shape selected from the group consisting of oval-shaped, elliptical-shaped and cylindrical-shaped.

The shape of the container is optional but preferably in the shape of a tube of toothpaste closed at a rear end and having a generally oval-shaped or generally elliptical-shaped sidewall and a front end having a front wall with an opening through which an applicator partially extends. The closed rear end, sidewall, front wall and portion of the applicator surround an interior chamber in which there is retained material which could be hazardous to a child, hereafter referred to as "a precautionary material". The applicator is used to dispense the precautionary material. The applicator is preferably a rollerball. It is within the spirit and scope of the present invention to include other types of applicators.

It is also within the spirit and scope of the present invention for the container to be cylindrical in shape with a closed rear end, a cylindrical sidewall and a front end having a front wall with an opening through which an applicator partially extends. The closed rear end, sidewall, front wall and portion of the applicator surround an interior chamber in which there is retained a precautionary material. The applicator is used to dispense the precautionary material. The applicator is preferably a rollerball. It is within the spirit and scope of the present invention to include other types of applicators.

The first key feature of the present invention is that the container is made of material selected from the group consisting of rolled laminated plastic and rolled laminated aluminum each having from one to eight layers of rolled laminated plastic or aluminum. The plastic is selected from the group consisting of polypropylene, polyethylene or combinations including one or more of these plastics. An important feature of the present invention is for a sidewall of the container, regardless of shape, to be flexible and squeezable so that the precautionary material is forced onto (or into depending on the applicator) the applicator which dispenses the precautionary material. The precautionary material may be dispensed onto the skin, or fingernail, or toenail of a person, or onto or into a surface, cavity, or other location of an object depending on what the precautionary material is and its intended use.

The second key feature of the present invention is that the applicator and at least a portion of the front wall of the container are closed by a removable child-resistant locking cap. The locking cap includes at least one, and preferably a pair, of locking teeth. The front wall of the container has at least one mating locking member to be engaged by the at least one locking tooth, or preferably a pair of spaced apart mating locking members to be respectively engaged by a respective locking tooth. The child-resistant locking cap has a location portion as part of the locking assembly to enable a locking tooth from the locking cap to be aligned with a respective mating locking member. The location portion on the wall of the locking cap requires knowledge of being able to find the location and cause the locking cap to rotate to perform the required alignment of each locking tooth with a respective mating locking member.

The third novel, but optional feature of the present invention is for the applicator to be a rollerball.

The present invention also includes a cap removably affixed to the container with a unique child-resistant locking member to prevent a child from removing the cap and gaining access to the precautionary material within the container.

It is an object of the present invention to create a container made of rolled laminated plastic or rolled laminated aluminum each having from one to eight layers of rolled laminated plastic or aluminum to have a flexible sidewall to facilitate dispensing of a precautionary material within an internal chamber of the container.

It is also an object of the present invention to include a child-resistant locking assembly between the container and the removable cap to reduce the ability of a child to remove the locking cap and gain access to the precautionary material inside the container.

It has additionally been discovered, according to the present invention, that the ability to effectively seal the container, regardless of whether its shape is oval, elliptical or cylindrical, is a key innovation of the present invention and depends on the contents contained within the container. If the contents is very liquid and flows with limited viscosity, the contents may flow out of the opening in the dispensing nozzle having a rollerball applicator and seep out of the container, even after the cap is affixed to the dispensing nozzle and the child-resistant locking member is in place.

It is therefore a further object of the present invention to add an improved sealing cap to mate with an improved dispensing nozzle to securely seal the container and prevent the contents from flowing out after the container is closed. The improvement includes a central post which extends from the interior top surface of the sealing cap and is aligned with and parallel to the sidewall of the sealing cap. The dispensing nozzle is fitted with a cylindrical sponge at its dispensing end. The sponge has a central longitudinal shaft aligned with the opening of the dispensing nozzle. Therefore, the sealing cap having internal threads is fitted over the sponge and threaded onto the dispensing nozzle having mating exterior threads. An innovation of a central post is press fit through the central shaft of the sponge and the opening in the dispensing nozzle to provide a secure seal to prevent the contents of the container from seeping out, even after the container is closed. If there is no sponge, the central post is inserted directly into front opening of the nozzle opening.

In one of the embodiments, an applicator has a cylindrical shaped body made of foam or other similar absorption capable material that extends away from the central nozzle. The cylindrical shaped body also includes a centrally located open cylindrical chamber that receives a post located in the cap as just described. This embodiment of the applicator assists in retaining the contents in a useable position and prevents the precautionary material from seeping out after the container is closed with the sealing cap.

In one improvement, the present invention is an apparatus comprising:
a. a cap including:
  (i) a top wall having an exterior surface and an interior surface, a first circumferential wall integrally formed with the interior surface of the top wall, the first circumferential wall having an exterior surface and an interior surface including mating threads;
  (ii) the interior surface of the top wall is integrally formed with a second exterior circumferential wall with said second exterior circumferential wall having an exterior surface and an interior surface,
  (iii) the interior surface of said second circumferential wall includes a first transverse bar and a second transverse bar,
  (iv) said first transverse bar extending from the interior surface of the exterior sidewall toward a center of the cap and the first transverse bar further including a first locking tooth at a distal end of the first transverse bar,
  (v) the second transverse bar extending from the interior surface of the exterior sidewall toward a center of the cap and the second transverse bar a top wall, a first circumferential wall, and a second circumferential wall with the first circumferential wall having an exterior surface and an interior surface;
  (vi) the first transverse bar is opposite the second transverse bar;
  (vii) a central post affixed at its proximal end to said interior surface of said top wall, the post including a body terminating in a distal end;
(b) a container including:
  (i) a closed rear end, an exterior sidewall and a transverse top wall surrounding an interior chamber,
  (ii) a centrally located dispensing nozzle integrally formed with said transverse top wall and having a threaded vertical wall with mating threads on the threaded vertical wall, the dispensing nozzle including a longitudinal interior shaft extending into transverse top wall and a distal central opening, the longitudinal interior shaft leading to said interior chamber, and
  (iii) the top wall of the container further including a first standoff affixed to the top wall of the container and located between the dispensing nozzle and a top circumferential edge of the front wall, the first standoff having a first body with a first cavity extending from a surface of the first body into the first body, an oppositely disposed second standoff affixed to the top wall of the container and located between the dispensing nozzle and a top circumferential edge of the front wall, the second standoff having a second body with a second cavity extending from a surface of the second body into the second body, the first standoff and the second standoff located on opposite sides of the dispensing nozzle;
(c) the cap removably affixed to the dispensing nozzle, each respective locking tooth of each respective transverse bar of the cap engaging a respective cavity of a respective standoff of the container, and the mating threads of the cap threaded onto the threaded vertical wall of the dispensing nozzle, the central post extending through said longitudinal interior shaft to seal said central opening in said dispensing nozzle; and
d. whereby, a simultaneous inward pressure on said exterior surface of said second circumferential sidewall of the cap at locations adjacent said first transverse bar and said second transverse bar of said cap disengage said first tooth from said first cavity of said first standoff and disengage said second tooth from said second cavity of said second standoff.

In another improvement, the present invention is an apparatus comprising:
a. a cap including:
  (i) a top wall having an exterior surface and an interior surface, a first circumferential wall integrally formed with the interior surface of the top wall, the first circumferential wall having an exterior surface and an interior surface including mating threads;
  (ii) the interior surface of the top wall is integrally formed with a second exterior circumferential wall with said second exterior circumferential wall having an exterior surface and an interior surface,
  (iii) the interior surface of said second circumferential wall includes a first transverse bar and a second transverse bar,
  (iv) said first transverse bar extending from the interior surface of the exterior sidewall toward a center of the cap and the first transverse bar further including a first locking tooth at a distal end of the first transverse bar,
  (v) the second transverse bar extending from the interior surface of the exterior sidewall toward a center of the cap and the second transverse bar further including a second locking tooth at a distal end of the second transverse bar, and
  (vi) the first transverse bar is opposite the second n one improvement, the sealing cap included gaps
(b) a container including:
  (i) a closed rear end, an exterior sidewall and a transverse top wall surrounding an interior chamber,
  (ii) a centrally located dispensing nozzle integrally formed with said transverse top wall and having a threaded vertical wall with mating threads on the threaded vertical wall, the dispensing nozzle including a longitudinal interior shaft extending into transverse top wall and a distal central opening, the longitudinal interior shaft leading to said interior chamber, and
  (iii) the top wall of the container further including a first standoff affixed to the top wall of the container and located between the dispensing nozzle and a top circumferential edge of the front wall, the first standoff having a first body with a first cavity extending from a surface of the first body into the first body, an oppositely disposed second standoff affixed to the top wall of the container and located between the dispensing nozzle and a top circumferential edge of the front wall, the second standoff having a second body with a second cavity extending from a surface of the second body into the second body, the first standoff and the second standoff located on opposite sides of the dispensing nozzle;

(c) the cap removably affixed to the dispensing nozzle, each respective locking tooth of each respective transverse bar of the cap engaging a respective cavity of a respective standoff of the container, and the mating threads of the cap threaded onto the threaded vertical wall of the dispensing nozzle with the interior surface of the cap sealing the opening in the dispensing nozzle; and d. whereby, a simultaneous inward pressure on said exterior surface of said second circumferential sidewall of the cap at locations adjacent said first transverse bar and said second transverse bar of said cap disengage said first tooth from said first cavity of said first standoff and disengage said second tooth from said second cavity of said second standoff.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
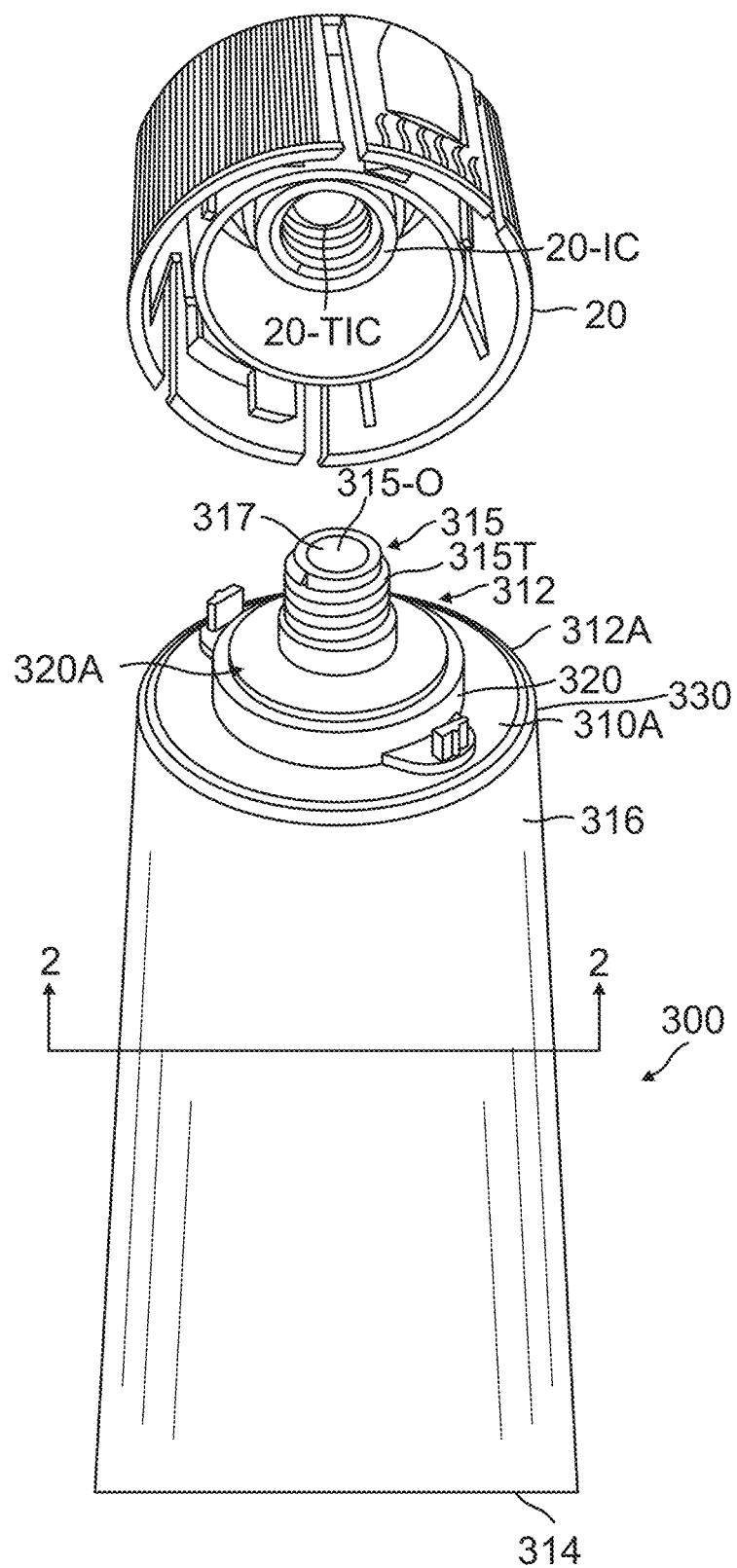
FIG. 1 is an exploded view of the present invention cap and a side perspective view of an oval-shaped container embodying a portion of the present invention.

Referring to FIG. 1, there is illustrated an exploded view of the cap 20 of the present invention viewed in a bottom perspective view and an oval-shaped container 300 illustrated in a side perspective view.

Figure 2:
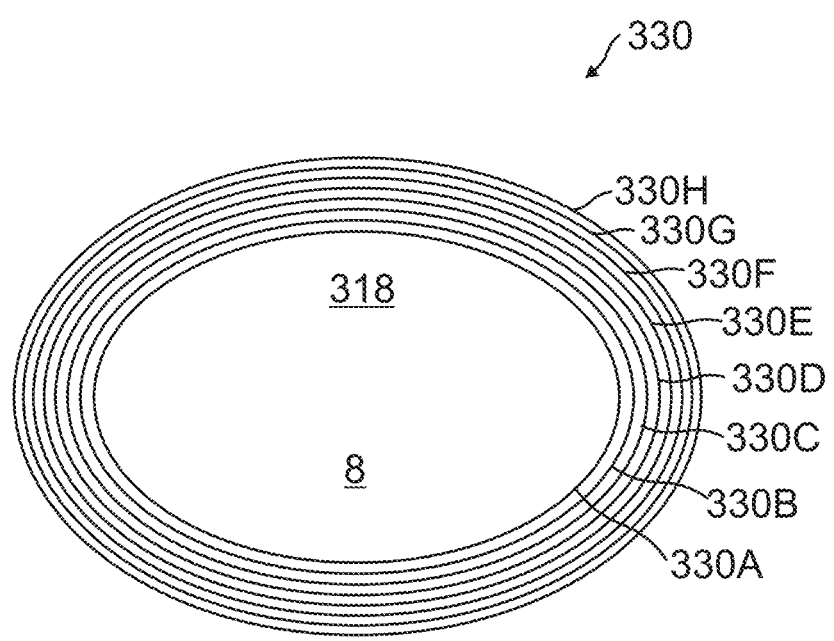
FIG. 2 is a cross-sectional view taken along line 2-2 of FIG. 1.

Further referring to FIG. 1, there is illustrated an exploded perspective view of a cap and an oval-shaped container 300 in which precautionary material, such as medicines, poison, and flammable material are contained in interior chamber 318 (see FIG. 2). It is within the spirit and scope of the present invention to include any items which may be hazardous or harmful to a child or any person if not handled properly. Harmless items may also be retained in the present invention.

Further referring to FIG. 1, oval-shaped container 300 has a closed rear end 314, an oval-shaped sidewall 316, a front end 312 with a front top wall 312A surrounding a front wall 310A. A supporting collar 320 including a collar top wall 320A supporting a central top nozzle 315 having threads 315T on its exterior surface, the nozzle 315 including a top opening 315-O with at least a portion of a central rollerball applicator 317 extending through the opening 315-O. The cap 20 will be described in detail later on in this patent application. As illustrated in FIG. 1, the cap 20 includes an interior central collar 20-IC with mating interior threads 20-TIC which mate with threads 315T as the cap 20 is threaded onto the nozzle 315.

Referring to FIG. 2, there is illustrated a cross-sectional view taken along line 2-2 of FIG. 1, illustrating the material layers of the oval-shaped container 300. The oval-shaped container 300 is made of material selected from the group consisting of rolled laminated plastic and rolled laminated aluminum illustrated in FIG. 1 as 330. The rolled laminated plastic and/or rolled laminated aluminum is preferably formed in layers having from one (1) to eight (8) layers numbered in FIG. 2 from most interior to most exterior 330A, 330B, 330C, 330D, 330E, 330F, 330G and 300H. The plastic is selected from the group consisting of polypropylene, polyethylene, polyvinyl or combinations including one or more of these plastics. This rolled laminated material creates a flexible sidewall so that the contents 8 can be squeezed out of the interior chamber to be dispensed.

Figure 3:
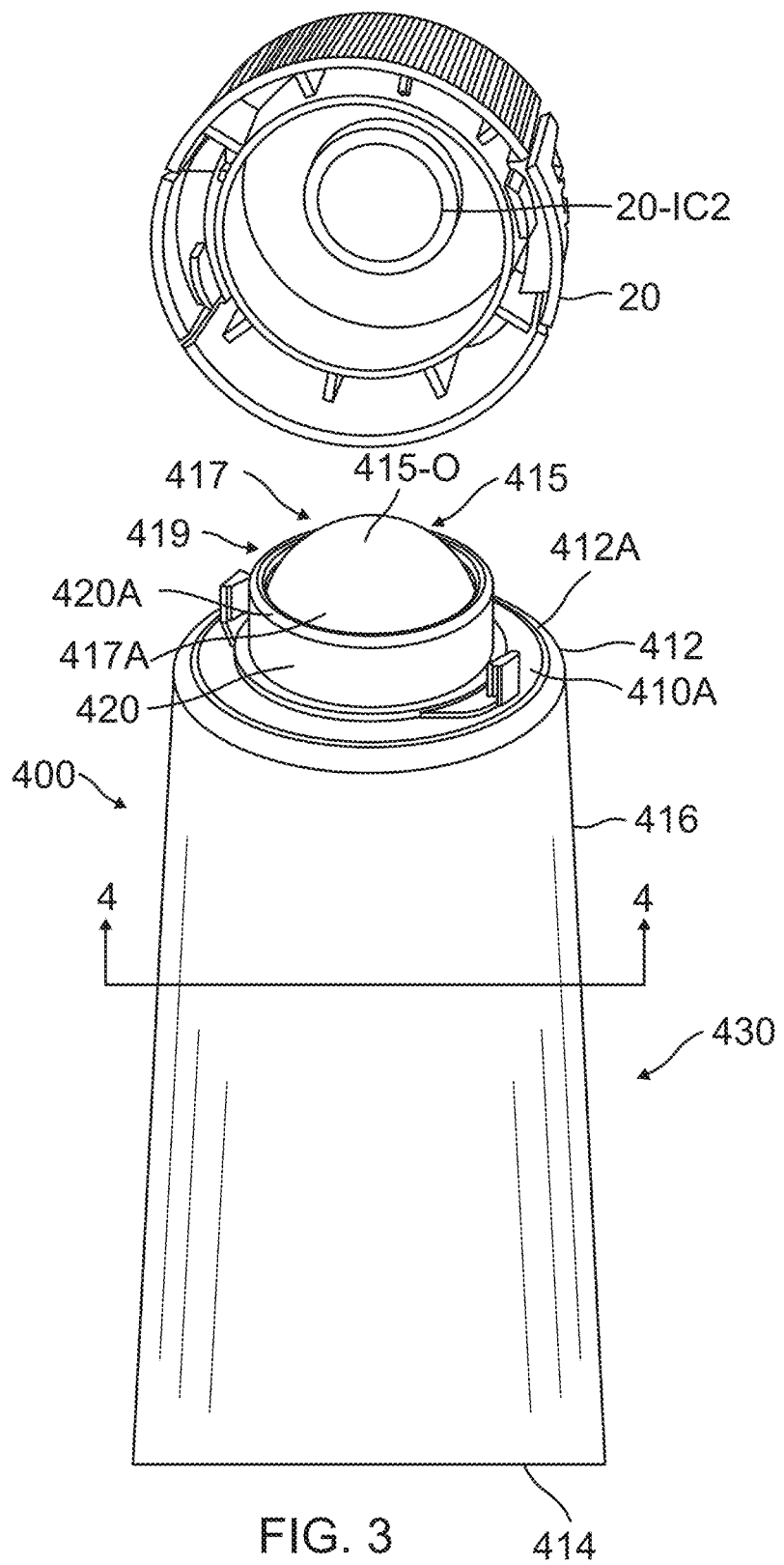
FIG. 3 is an exploded view of the present invention cap and a side perspective view of an elliptical-shaped container embodying a portion of the present invention.
Figure 4:
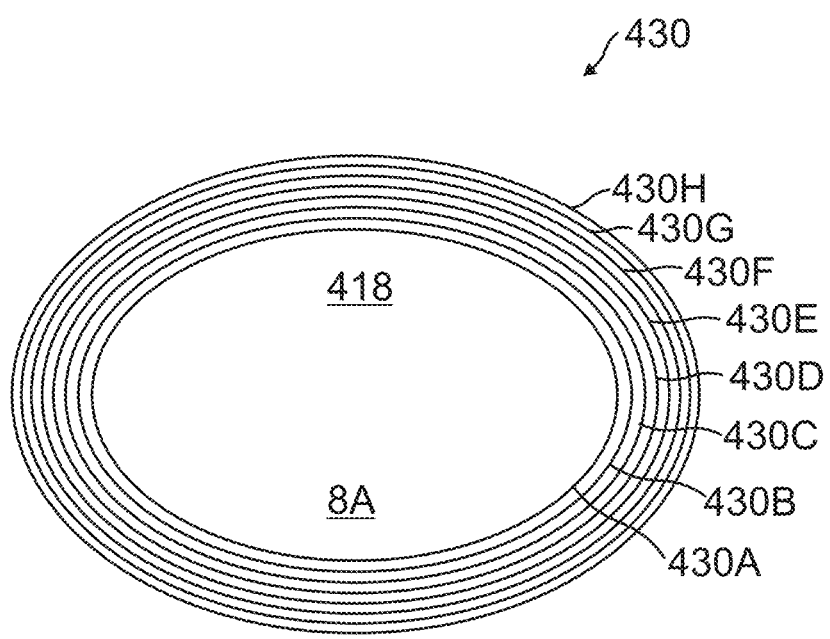
FIG. 4 is a cross-sectional view taken along line 4-4 of FIG. 3.

FIGS. 3 and 4 illustrate an alternative embodiment of the present invention having an elliptical-shaped sidewall. Referring to FIG. 3, there is illustrated an exploded view of the cap 20 of the present invention viewed in a bottom perspective view and an elliptical-shaped container 400 illustrated in a side perspective view.

Further referring to FIG. 3, there is illustrated a perspective view of an elliptical-shaped container 400 in which precautionary material 8, such as medicines, poison, and flammable material are contained within interior chamber 318. It is within the spirit and scope of the present invention to include any items which may be hazardous or harmful to a child or any person if not handled properly. Harmless material may also be retained.

The elliptical-shaped container 400 has a closed rear end 414, an elliptical-shaped sidewall 416, a front end 412 with a front top wall 412A surrounding a front wall 410A. A supporting collar 420 with a top wall 420A supporting a central top nozzle 415 with a smooth surface its exterior surface the nozzle 415 including a top opening 415-O with at least a portion of a central rollerball applicator 417 extending through the opening 415-O. As illustrated in FIG. 3, the cap 20 includes an interior central collar 20-IC2 with a smooth interior sidewall 20-S, to press fit retain the collar 20 against smooth surface of the central nozzle 415. The rollerball applicator numbered 417A partially extends away from the centralized nozzle and is in contact with the contents 8A in interior chamber 418. It is also within the spirit and scope of the present invention for the rollerball applicator 417A to extend directly out of opening 417 without the nozzle. The rollerball applicator then partially extends out of front wall 412A and is partially in contact with chamber 418 so that it comes in contact with the retained precautionary material 8A to dispense the precautionary material.

The elliptical wall 416 is flexible and squeezable to dispense interior contents to the rollerball applicator. The rear end 414, elliptical-shaped sidewall 416 and front wall 412 surround an interior chamber 418 (see FIG. 4) to retain at least one of the precautionary materials 8A. Also illustrated are standoffs 410 and 420.

Referring to FIG. 4, there is illustrated a cross-sectional view taken along line 4-4 of FIG. 3, illustrating the material layers of the elliptical-shaped container 400. The elliptical-shaped container 400 is made of material selected from the group consisting of rolled laminated plastic and rolled laminated aluminum illustrated in FIG. 3 as 430. The rolled laminated plastic and/or rolling laminated aluminum is preferably formed in layers having from one (1) to eight (8) layers numbered in FIG. 4 from most interior to most exterior 430A, 430B, 430C, 430D, 430E, 430F, 430G and 400H. The plastic is selected from the group consisting of polypropylene, polyethylene, polyvinyl or combinations including one or more of these plastics. This rolled laminated material creates a flexible sidewall so that the contents 8A can be squeezed out of the interior chamber to be dispensed.

Figure 5:
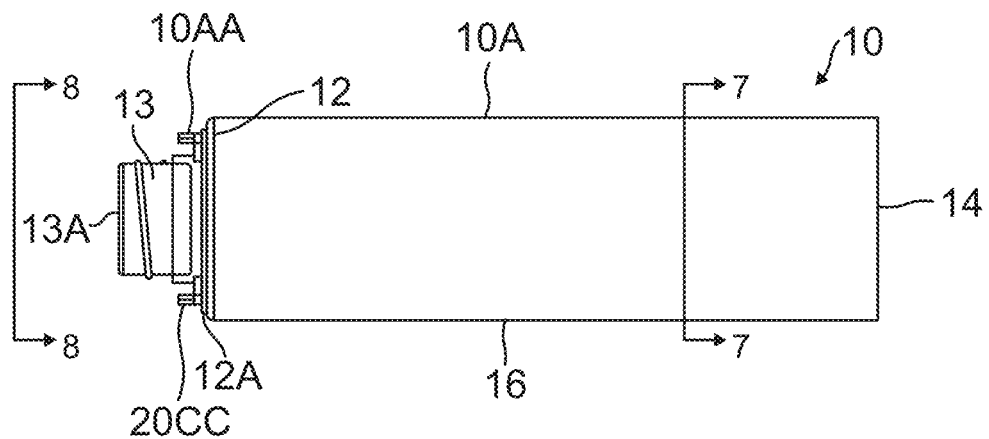
FIG. 5 is a side elevational view of a cylindrical-shaped container embodying a portion of the present invention.
Figure 6:
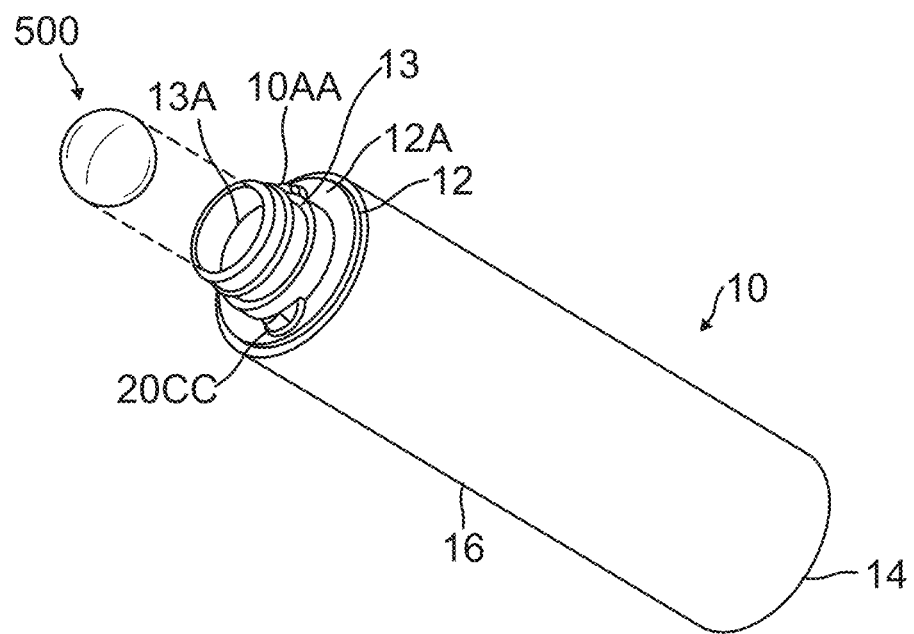
FIG. 6 is a side perspective view of a cylindrical-shaped container embodying a portion of the present invention.
Figure 7:
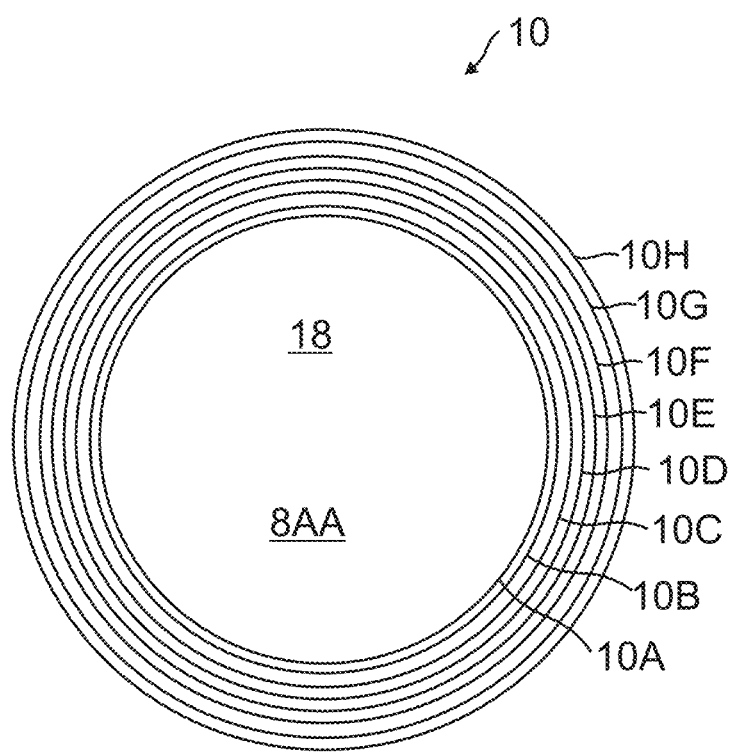
FIG. 7 is a cross-sectional view taken along line 7-7 of FIG. 5.
Figure 8:
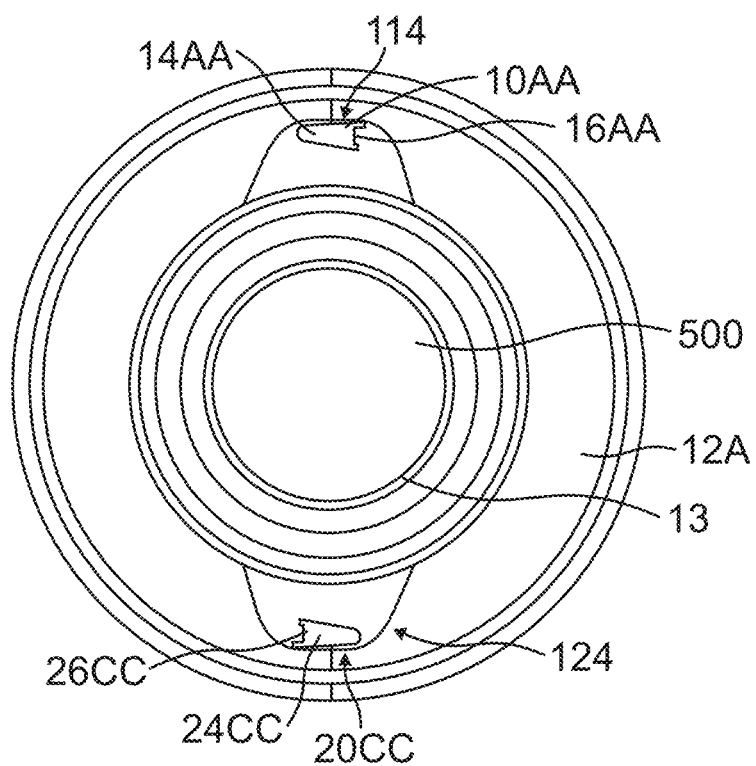
FIG. 8 is a front view taken from lines 8-8 of FIG. 5 to illustrate the mating locking members, also called tube standoff, affixed to the front wall of a container, including containers having an oval-shaped sidewall, an elliptical-shaped sidewall, and a cylindrical-shaped sidewall.

A third cylindrical variation of the container is illustrated in FIGS. 5 through 8. FIG. 5 is a side elevational view of a cylindrical-shaped container embodying a portion of the present invention. FIG. 6 is a side perspective view of a cylindrical-shaped container embodying a portion of the present invention. FIG. 7 is a cross-sectional view taken along line 7-7 of FIG. 5. FIG. 8 is a front view taken from lines 8-8 of FIG. 5 to illustrate the mating locking members, also called tube standoff, affixed to the front wall of a container, including containers having an oval-shaped sidewall, an elliptical-shaped sidewall, and a cylindrical-shaped sidewall.

FIGS. 5 through 8 illustrate an alternative embodiment of the present invention having a cylindrical-shaped sidewall.

Further referring to FIG. 5 through 7, there is illustrated a cylindrical-shaped container 10 in which precautionary material 8AA, such as medicines, poison, and flammable material are contained. It is within the spirit and scope of the present invention to include any items which may be hazardous or harmful to a child or any person if not handled properly. Harmless items may also be retained.

The cylindrical-shaped container 10 has a closed rear end 14, a cylindrical-shaped sidewall 16, a front end 12 with a front wall 12A and a nozzle 13 and a central opening 13A through which rollerball applicator 500 partially extends away from front wall 12A and is in contact with the contents 8AA in interior chamber 18. Therefore, it is also within the spirit and scope of the present invention for the rollerball applicator 500 to extend directly out of opening 13. The rollerball applicator 500 then partially extends out of front opening 13A and is partially in contact with chamber 18 so that it comes in contact with the retained precautionary material 8AA to dispense the precautionary material.

The cylindrical sidewall 16 is flexible and squeezable to dispense interior contents to the rollerball applicator. The rear end 14, cylindrical-shaped sidewall 16 and front wall 12A surround an interior chamber 18 (see FIG. 7) to retain at least one of the precautionary materials 8AA.

Referring to the cross-sectional view of FIG. 7, the cylindrical-shaped container 10 is made of material selected from the group consisting of rolled laminated plastic and rolled laminated aluminum 10, each having from one (1) to eight (8) layers 10A, 10B, 10C, 10D, 10E, 10F, 10G and 10H of rolled laminated plastic or aluminum. The plastic is selected from the group consisting of polypropylene, polyethylene, polyvinyl or combinations including one or more of these plastics. This rolled laminated material creates a flexible sidewall so that the contents 8AA can be squeezed out of the interior chamber to be dispensed.

An important innovation of the present invention is a child-resistant locking assembly generally referred to as 100 in the subsequent figures. While illustrated using the cylindrical-shaped sidewall, the same locking assembly is also utilized with other shaped container having the above described oval-shaped sidewall 316 and elliptical-shaped sidewall 416.

Figure 9:
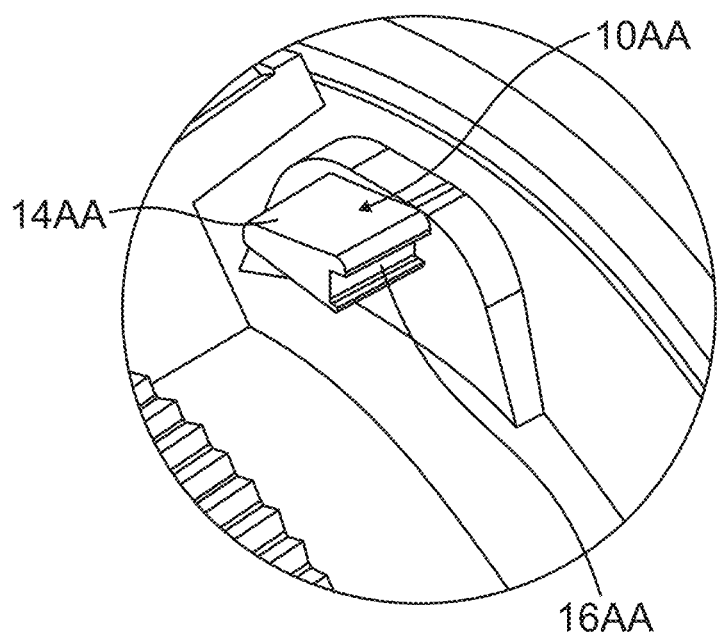
FIG. 9 is an enlarged view of a tube standoff.
Figure 10:
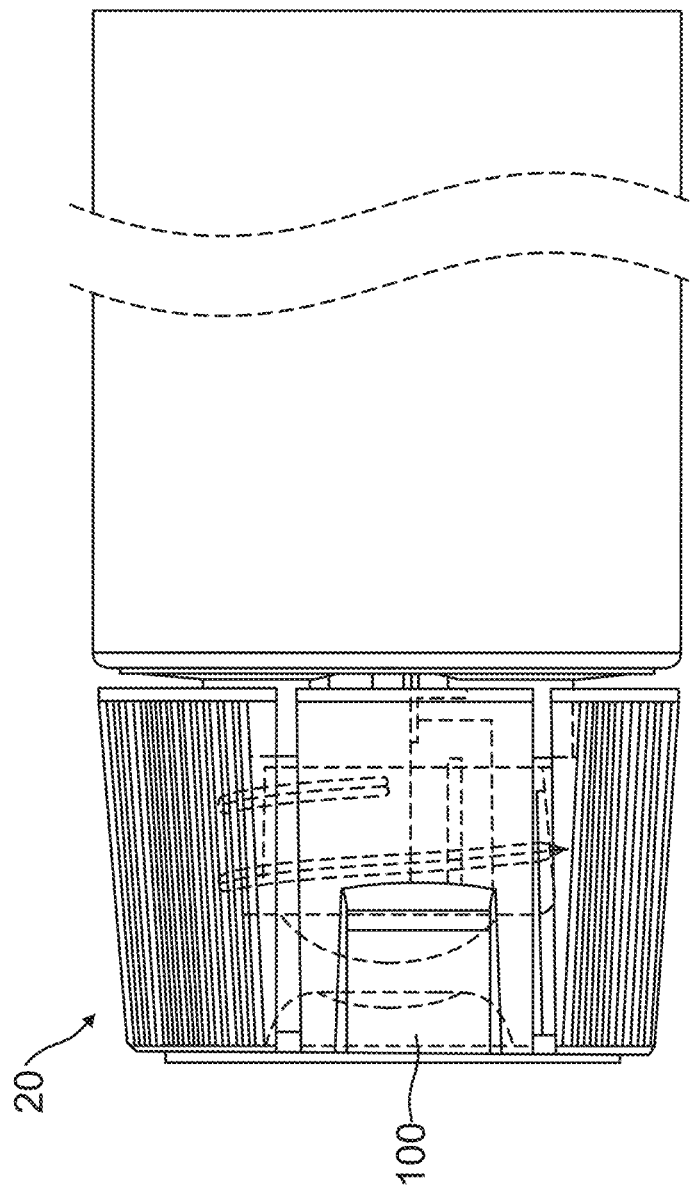
FIG. 10 is a side view of the cap illustrated in partial cross-section to illustrate a portion of the locking cavity within the cap.

FIG. 9 is an enlarged view of a tube standoff FIG. 10 is a side view of the cap illustrated in partial cross-section to illustrate a portion of the locking cavity within the cap.

Figure 11:
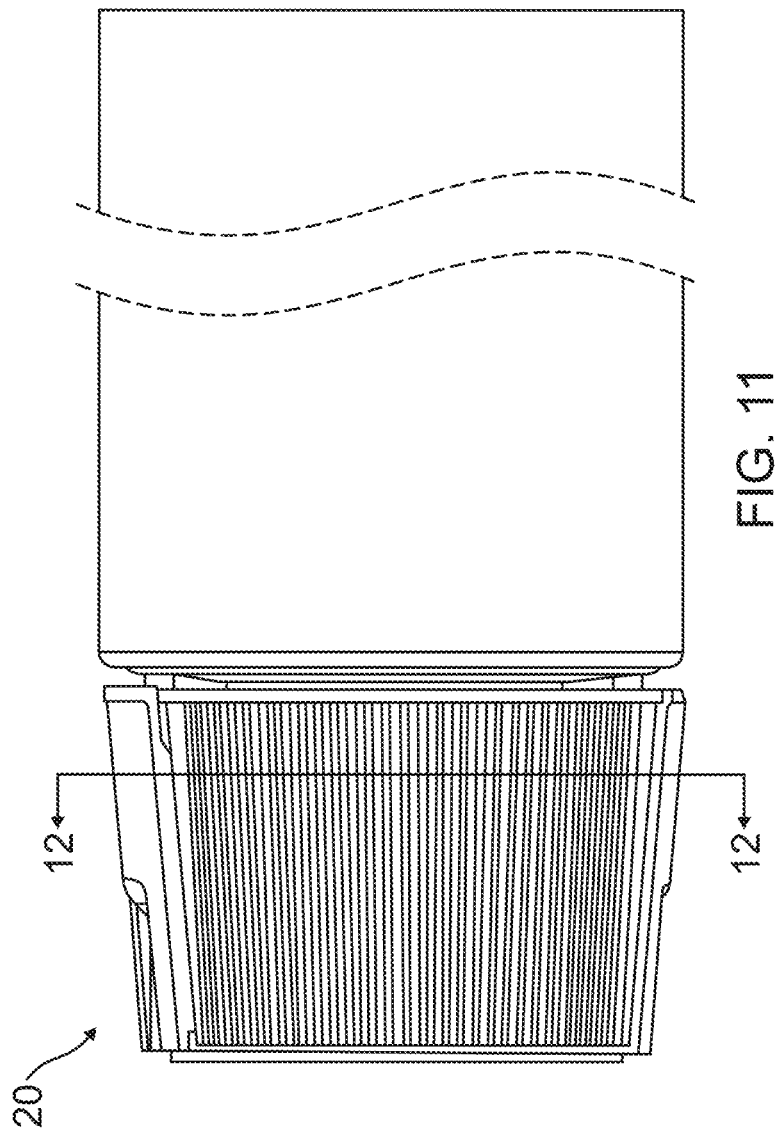
FIG. 11 is an exterior side view of the cap of the present invention.
Figure 12:
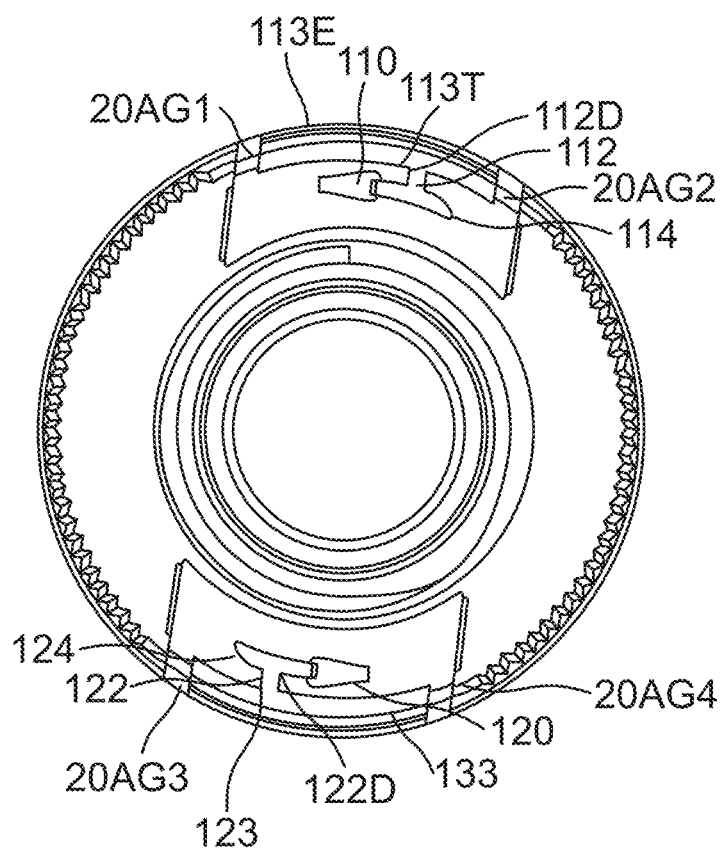
FIG. 12 is a cross-sectional view taken along line 12-12 of FIG. 11.
Figure 13:
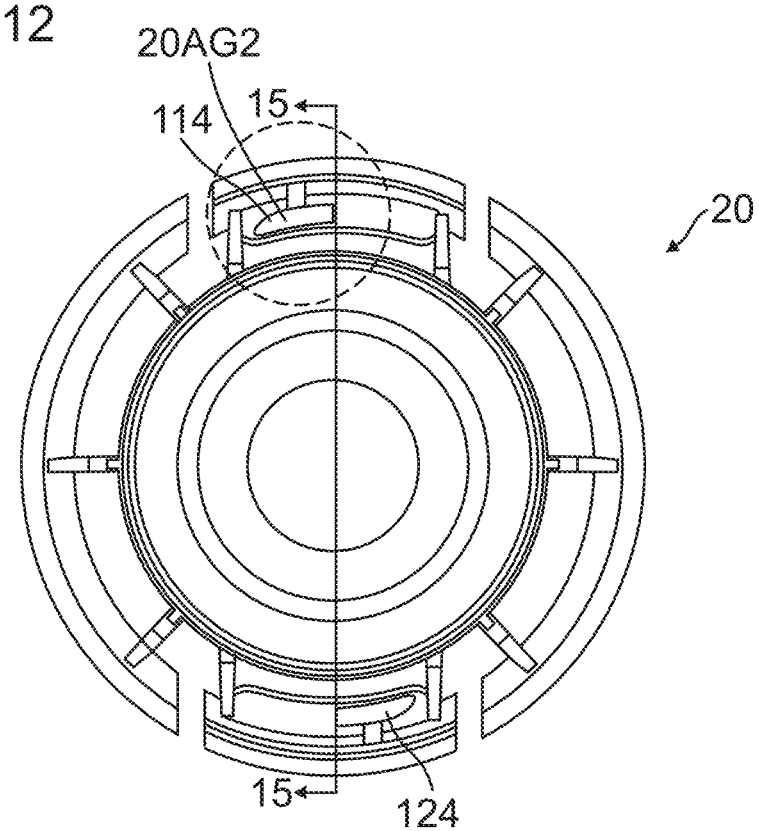
FIG. 13 is a cross-sectional of the cap illustrating a pair of oppositely disposed cap locking teeth.
Figure 14:
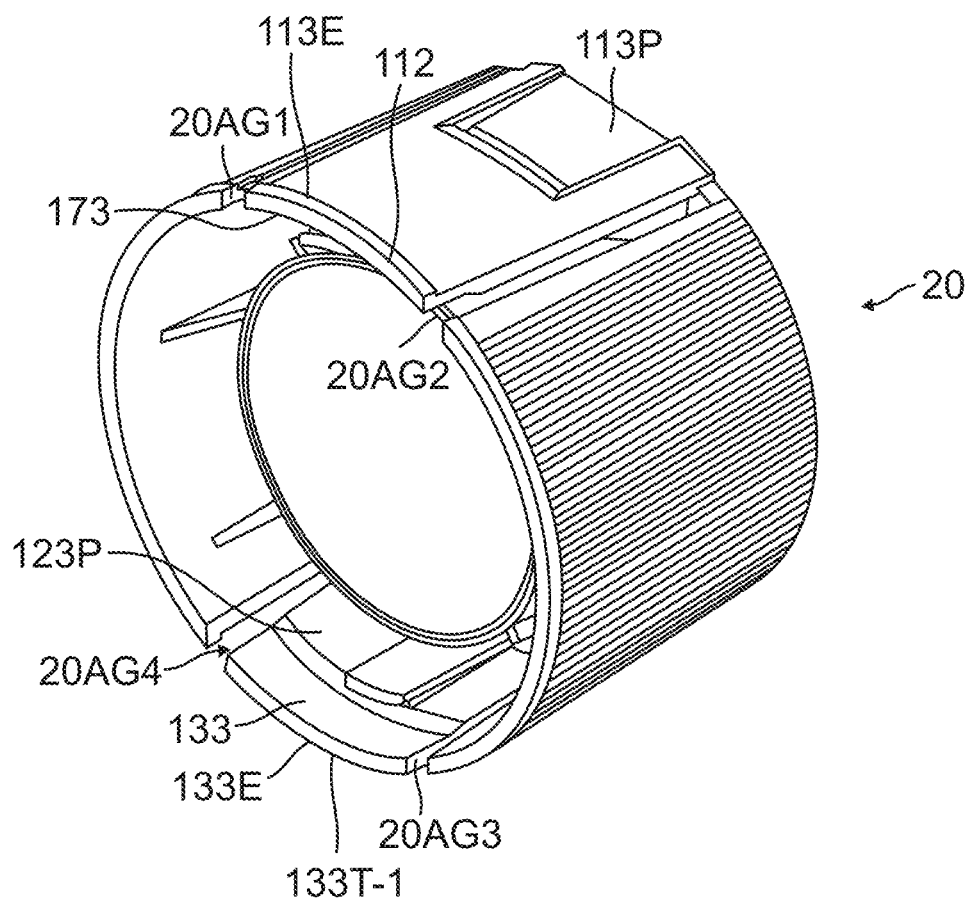
FIG. 14 is a bottom plan view of the locking assembly on the cap.
Figure 15:
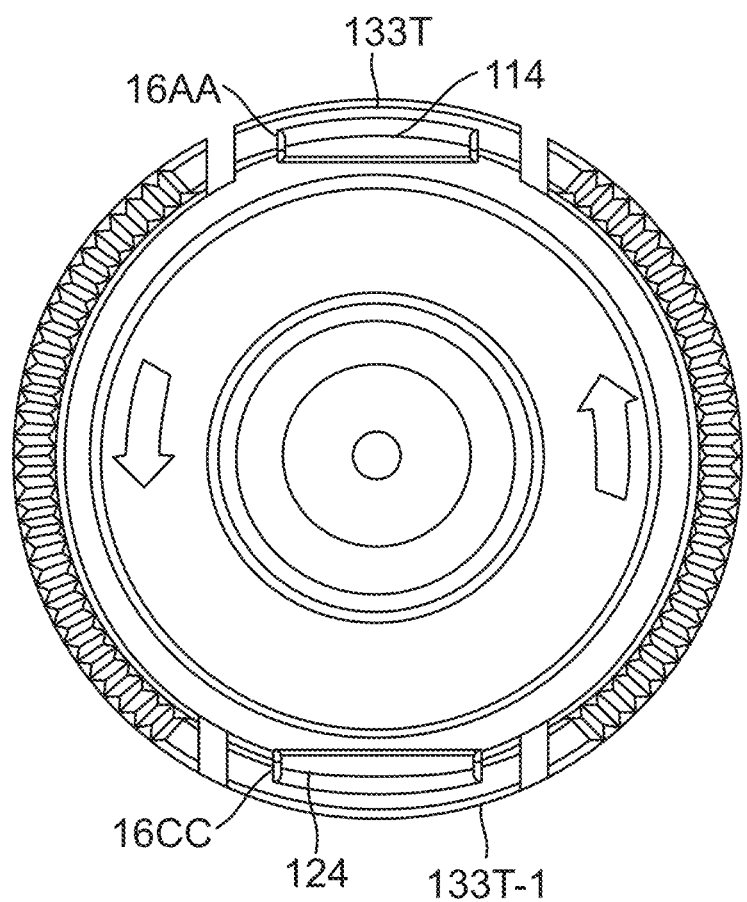
FIG. 15 is a bottom cross-sectional view of the cap in the locked position; \

FIG. 11 is an exterior side view of the cap of the present invention. FIG. 12 is a cross-sectional view taken along line 12-12 of FIG. 11. FIG. 13 is a cross-sectional view of the cap illustrating a pair of oppositely disposed cap locking teeth. FIG. 14 is a bottom plan view of the locking assembly on the cap. FIG. 15 is a bottom cross-sectional view of the cap in the locked position.

FIG. 5 is a side elevational view of the container 10 with the cap removed and illustrating a pair of oppositely disposed tube standoffs 10AA and 20CC. FIG. 8 is a front view taken from lines 8-8 of FIG. 5, illustrating tube standoff 10AA having a body 14AA and a cavity 16AA. Similarly, oppositely disposed tube standoff 20CC has a body 24CC with a cavity 26CC.

FIG. 10 is a side view of the cap 20 illustrated in partial cross-section to illustrate a portion of the locking assembly 100 which has a portion of container stand-off 10AA, body 14AA and cavity 16AA, all within the cap 20. FIG. 11 is an exterior side view of the cap 20 of the present invention. FIG. 12 is a cross-sectional view taken along line 12-12 of FIG. 11. The cap 20 has a first locking member 110 having a transverse bar 112 extending from an interior wall section 113 toward the interior of the cap 20 and locking tooth 114 at the distal end 112D. A pair of gaps 20AG1 and 20AG2 are on either end of interior wall section 113. Similarly, cap 20 has a second locking member 120 having a transverse bar 122 extending from an interior wall section 123 extending toward the interior of cap 20 and a locking tooth 124 at the distal end 122D. The pair of gaps 20AG3 and 20AG4 are on either end of interior wall section 123. Gaps 20AG1 and 20AG2 enable the cap 20 to be rotated. Similarly, gaps 20AG3 and 20AG4 enable the cap 20 to be rotated.

FIG. 13 is a cross-sectional view illustrating a pair of oppositely disposed cap locking teeth 114 and 124. FIG. 14 is a bottom plan view of the locking assembly on the cap. FIG. 15 is a bottom cross-sectional view of the cap in the locked position.

Referring to FIGS. 12 through 15, in order to lock the cap 20, the cap 20 is pressed inwardly at the location 113E of interior wall 113 where locking tooth 114 is located just in front of the cavity 16AA of tube standoff 10AA and is concurrently pressed inwardly at the exterior wall location 133T-1 corresponding to the location 133E of interior wall 133 where locking tooth 124 is located just in front of cavity 16CC of tube standoff 10CC. Therefore, the tooth 114 is aligned with cavity 26CC of tube standoff 20CC and the tooth 124 is aligned with cavity 26CC of tube standoff 20CC. By rotating the cap 20 in one direction such as counter-clockwise, the respective teeth 114 and 124 engage a respective cavity 16AA and 26CC to lock the cap 20 onto the cylinder 10.

Referring to FIGS. 14 and 15, to unlock, the cap 20 must be pressed inwardly at the exterior wall location 113E corresponding to the location of interior wall 113 where locking tooth 114 is located inside of the cavity 16AA of the tube standoff 10AA and is concurrently pressed inwardly at the exterior wall location 133T corresponding to the location 133T-1 of interior wall 133 where locking tooth 124 is inside of the cavity 26CC of tube standoff 20CC and the cap 20 is rotated in an opposite direction to disengage tooth 114 from cavity 16AA and disengage tooth 124 from cavity 26CC and then cap 20 off of cylinder 10.

The present invention cap is used with all variations of sidewalls including oval, elliptical and cylindrical.

The cap 20 has an extra indentation member 113P and an oppositely disposed indentation member 123P. The indentation markers 113P and 123P serve as a guide as to where to inwardly press the cap 20 and rotate the cap into the locked or unlocked position.

As set forth in the summary of the invention section, it has additionally been discovered, according to the present invention, that the ability to effectively seal the container, regardless of whether the shape of the container is oval as illustrated in FIGS. 1 and 2, elliptical as illustrated in FIGS. 3 and 4, or cylindrical as illustrated in FIGS. 5-8, depends on the contents contained within the container. If the contents is thin and flows with limited viscosity, the contents may flow out of the opening in the dispensing nozzle and seep out of the container, even after the cap is affixed to the dispensing nozzle and the child-resistant locking member is in place.

It is therefore a further object of the present invention to add an improved sealing cap to mate with an improved dispensing nozzle to securely seal the container and prevent the contents from flowing out after the container is closed.

Figure 16:
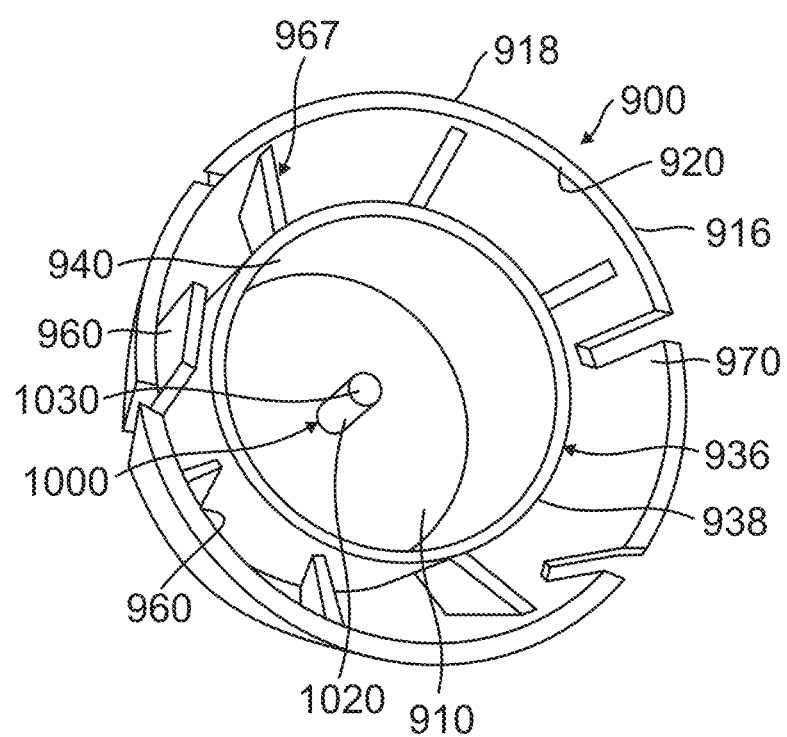
FIG. 16 is an exploded view of another improved variation of the present invention cap and a side perspective view of a cylindrical-shaped container embodying a portion of the present invention.
Figure 17:
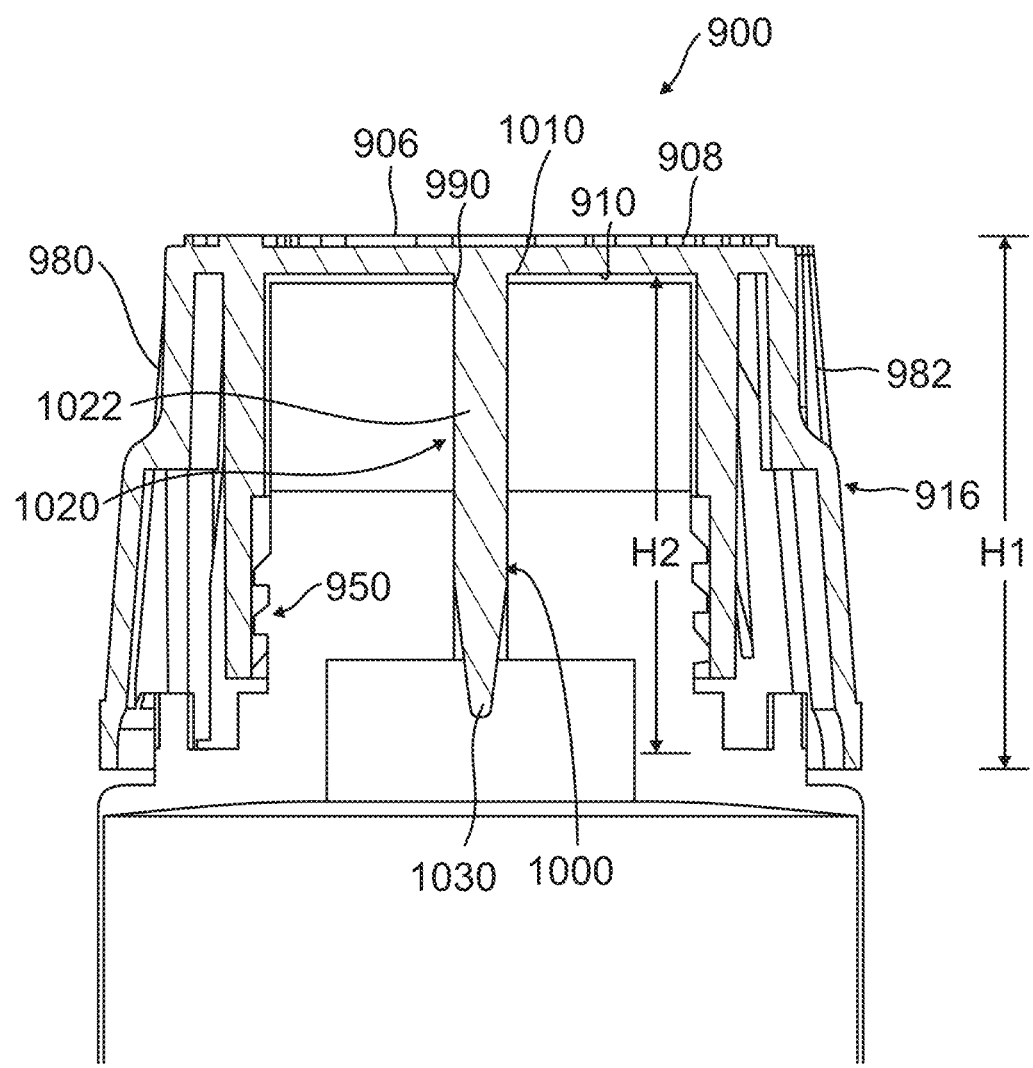
FIG. 17 is a close-up top perspective view of the improved sealing portion of the cylindrical shaped container illustrated in FIG. 16.
Figure 18:
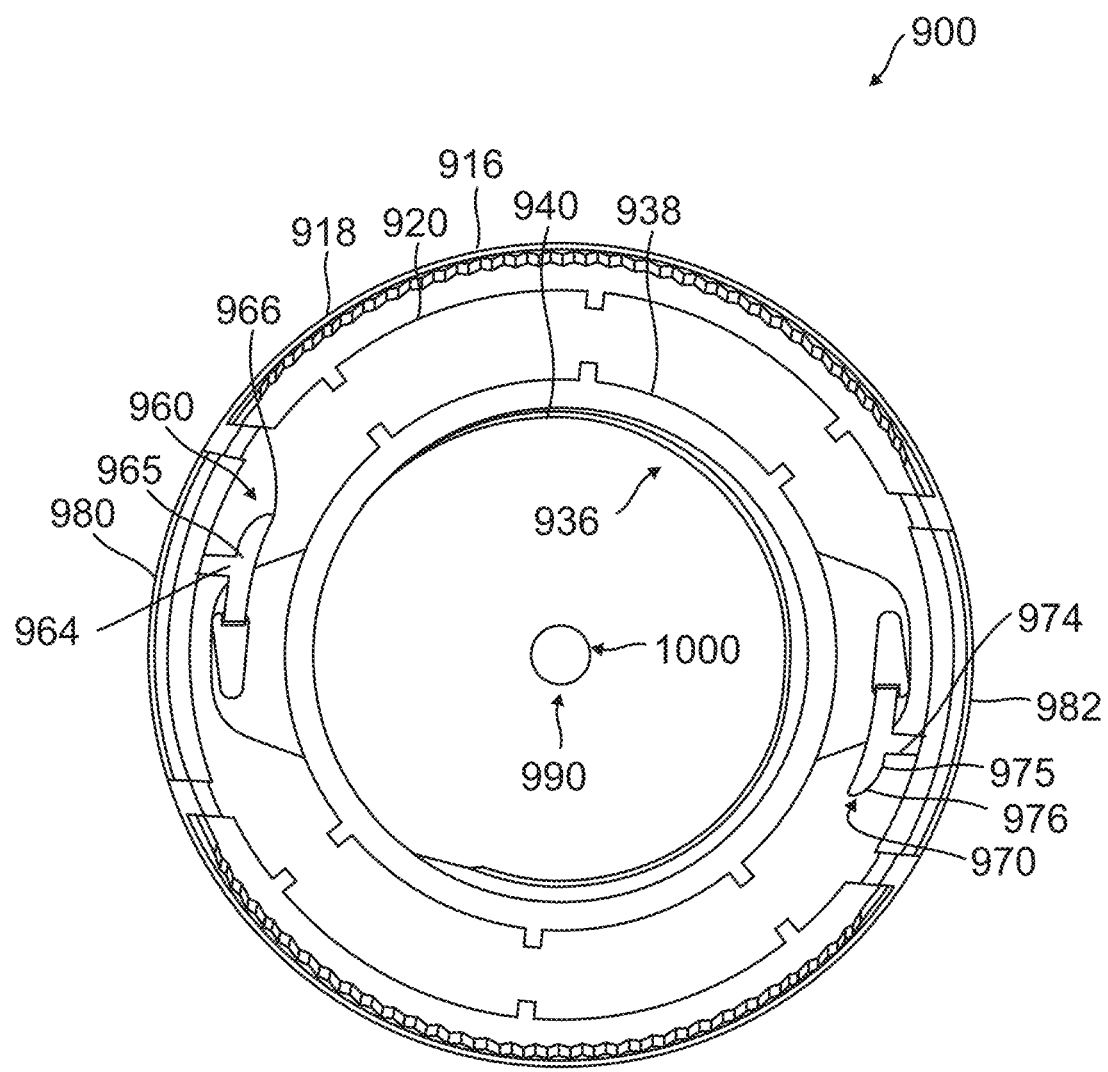
FIG. 18 is a bottom perspective view of an improved sealing cap from the embodiment illustrated in FIG. 16.

Referring to FIG. 16, there is illustrated is a partial bottom perspective view of an improved sealing cap. Referring to FIG. 17, there is illustrated a cross-sectional view through the longitudinal center of the improved sealing cap illustrated in FIG. 16. Referring to FIG. 18, there is illustrated a bottom plan view of the improved sealing cap illustrated in FIG. 16.

Referring to FIGS. 16, 17 and 18, the improved sealing cap 900 includes a transverse top wall 906 having an exterior surface 908 and an interior surface 910. The transverse top wall 906 is integrally formed with an exterior circumferential sidewall 916 having an exterior surface 918 and an interior surface 920. The interior surface 910 of transverse top wall 906 is also integrally formed with an interior circumferential sidewall 936 having an exterior surface 938 and an interior surface 940. The exterior circumferential wall has a height "H-1". The interior circumferential wall has a second height "H-2". Height "H-1" is taller than height "H-2".

Interior circumferential sidewall 936 includes cap mating teeth 950 on the interior surface 940. Spacer members 966 are located between the interior surface 920 of exterior circumferential sidewall 916 and the exterior surface 938 of interior circumferential sidewall 936.

The interior surface 920 of exterior circumferential sidewall 916 includes a first locking member 960 including a first transverse bar 964 extending from a first interior wall—also referred to as interior surface 920 of exterior sidewall 916 toward the center 990 of sealing cap 900 and a first locking tooth 966 at a distal end 965 of the first transverse bar 964. The interior surface 920 of exterior circumferential sidewall 916 includes a second locking member 970 including a second transverse bar 974 extending from a first interior wall, also referred to as interior surface 920, of exterior sidewall 916 toward the center 990 of sealing cap 900 and a second locking tooth 976 at a distal end 975 of the second transverse bar 974. The first locking member 960 is parallel to and opposite to the second locking member 970. Up to this point, the sealing cap 900 is substantially similar to the sealing cap 20 in FIGS. 1 and 3.

A portion of a central longitudinal post 1000 has a proximal end 1010 integrally formed at a center 990 of interior surface 910 of top transverse wall 906. The post 1000 includes an elongated shaft 1020 terminating at a distal end 1030. The body 1022 of the shaft 1020 is cylindrical except the portion of the shaft 1020 at a distance from the distal end 1030 tapers from cylindrical to a rounded pointed distal end 1030. A first marker 980 on the exterior surface 918 of the exterior circumferential sidewall 916 is aligned with the first locking member 960 and a second market 982 on an oppositely disposed location of the exterior surface 918 of the exterior circumferential sidewall 916 is aligned with the second locking member 970.

Figure 19:
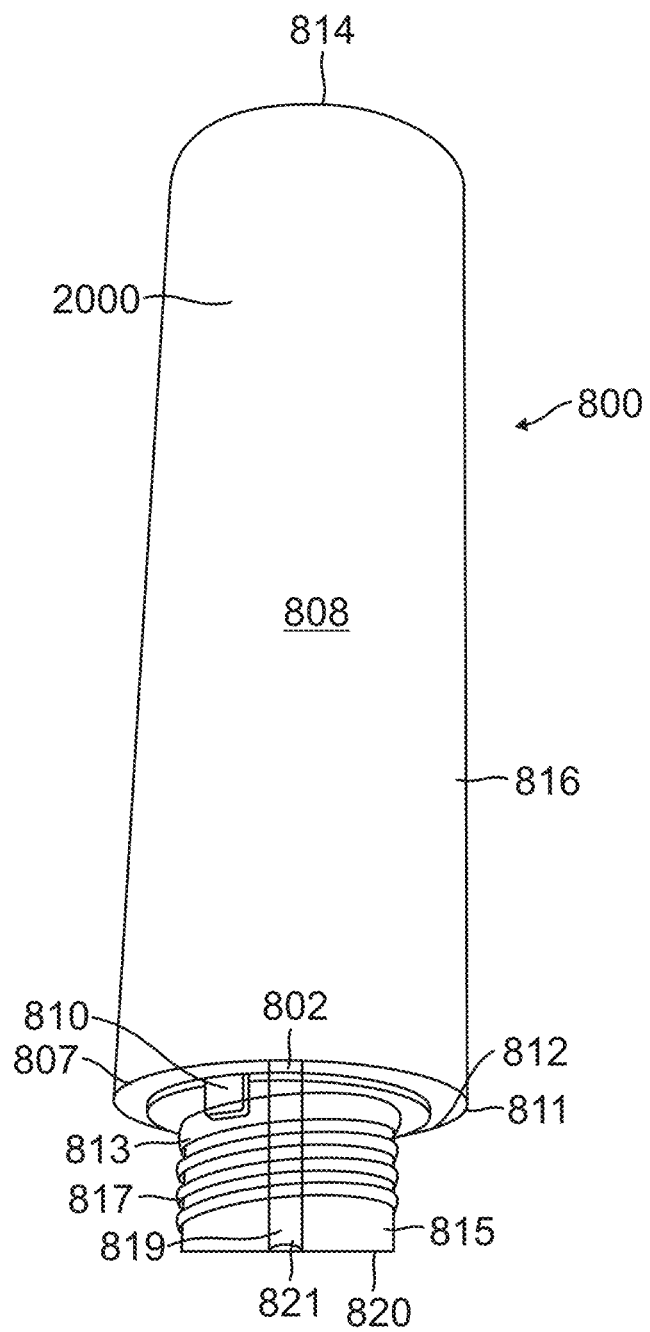
FIG. 19 is a cross-sectional view through the longitudinal center of the improved sealing cap illustrated in FIG. 18.
Figure 20:
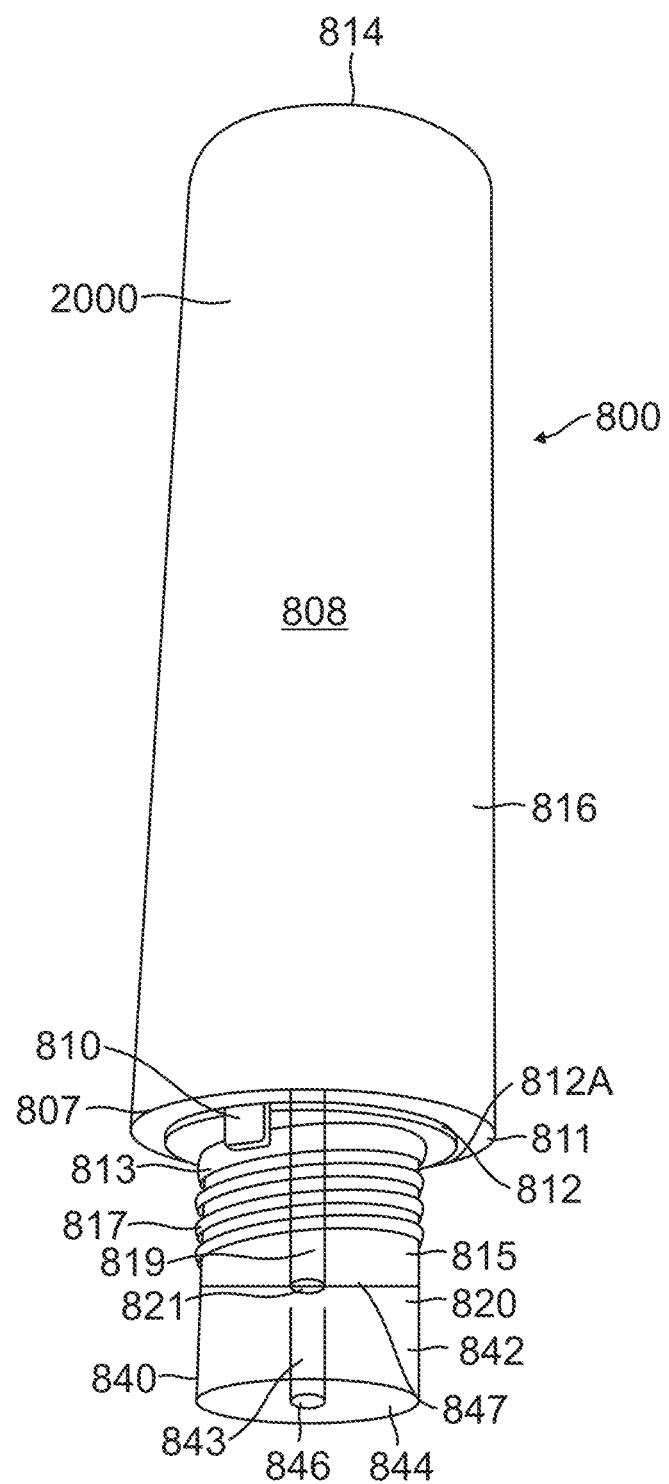
FIG. 20 is a bottom plan view of the improved sealing cap illustrated in FIG. 18.

Referring to FIG. 19, there is illustrated a bottom side-elevational view of an embodiment of the container with a modified dispensing nozzle used with the modified sealing cap illustrated in FIG. 16 through 18. Referring to FIG. 20, there is illustrated a bottom perspective view of an embodiment of the container with a modified dispensing nozzle and sponge applicator used with the modified sealing cap illustrated in FIGS. 16 through 18.

In one embodiment, the container 800 includes an integrally formed exterior flexible longitudinal sidewall 816, a closed rear end 814, and a transverse front wall 812A having a centrally located dispensing nozzle 815 including a longitudinal interior shaft 819 extending from an opening 821 at a distal transverse wall 820 of the dispensing nozzle 815 and through the transverse top wall 812 to an interior chamber 808 surrounded by the closed rear end 814, the exterior flexible longitudinal sidewall 816, and the transverse front wall 812A.

The dispensing nozzle 815 includes a longitudinal sidewall 813 having mating threads 817 which mate with the threads 950 on the sealing cap 900.

In a variation or alternative embodiment of the container 900A illustrated in FIG. 20, all of the elements which correspond to the embodiment in FIG. 19 are numbered the same with an "A" after each number. The additional component is a sponge 840 or sponge applicator having a transverse proximal rear surface 847, a cylindrical body 842, and a transverse distal front surface 844. The transverse proximal rear surface 847 of the sponge 840 is affixed to the transverse front wall 820 of the dispensing nozzle 815. The sponge 840 includes an interior shaft 843 extending from the distal front surface 844 to the proximal rear surface 847 and aligned with the longitudinal interior shaft 819 of the dispensing nozzle 815. The transverse front wall 812A of the container 800 further including a first standoff 810 affixed to the front wall of the container and located between the dispensing nozzle 815 and a top circumferential edge 807 of the front wall 812A. The first standoff 810 having a first body with a first cavity extending from a surface of the first body into the first body, an oppositely disposed second standoff 811 affixed to the front wall of the container and located between the dispensing nozzle and a top circumferential edge of the front wall as illustrated in FIG. 9, the second standing having a second body with a second cavity extending from a surface of the second body into the second body, the first standoff and the second standoff parallel to each other and located on opposite sides of the dispensing nozzle. The first standoff 810 is the same a standoff 114 illustrated in FIG. 8. The second standoff 81 is the same as standoff 120 illustrated in FIG. 8.

The sealing cap 900 is removably affixed to the dispensing nozzle with the central post 1000 of the sealing cap 900 inserted through the aligned central shaft 843 of the sponge 840 and the aligned central shaft 819 of the dispensing nozzle 815. A respective locking tooth of each respective locking member of the sealing cap engages a respective cavity of a respective standoff of the container. The mating threads on the sealing cap thread onto the mating threads of the dispensing nozzle.

The container is substantially the same as the oval container 300 illustrated in FIGS. 1 and 2, the elliptical container 400 illustrated in FIGS. 3 and 4, and the cylindrical container illustrated in FIGS. 5 through 8. For this discussion, the container 800 is cylindrical with a sidewall 816 and a bottom wall 814. Taking from the description in FIGS. 3 through 8, but with the example being cylindrical in shape, the container 800 is fabricated to retain precautionary material, such as medicines, poison, and flammable material. It is within the spirit and scope of the present invention to include any items which may be hazardous or harmful to a child or any person if not handled properly.

The container 800 has a closed rear end 814, a sidewall 816, a transverse front end 812 with a front wall 812A supporting a central nozzle 815. The central nozzle 815 includes a small central opening 821 in distal transverse end wall 820 of nozzle 815. The opening 821 extends to an internal shaft 819 which extends through the entire length of the nozzle and is in fluid communication with container opening 802 in transverse front end 812. The container includes an interior chamber 808 surrounded by closed rear end 814, sidewall 816 and transverse front end 812. Therefore, opening 821 is in fluid communication with interior chamber 808 through internal shaft 819 and chamber opening 802. Any contents within interior chamber 808 is dispensed through openings and shafts 802, 819, 821, 823 to sponge opening 846 by squeezing the container sidewall 816. The nozzle and opening replaces the previous rollerball dispensing member.

Closing the cap 900 has two closing elements. First, the nozzle 815 includes external threads 817 on its sidewall 813. The threads mate with mating teeth 950 of cap 900 to facilitate the cap 900 being screwed onto the nozzle 815. In addition, the container transverse front wall 812A includes a pair of oppositely disposed standoffs 810 and 811 which are engaged by the teeth 966 and 976 in the sealing cap 900 and function to lock the sealing cap 900 onto the container 800 for a child-resistant locking arrangement as previously discussed.

The sealing cap 900 is removably affixed to the dispensing nozzle with the shaft 1020 of the central post 1000 of the sealing cap 900 inserted through the aligned openings 821, 819 and 802 so that any contents within interior chamber 808, no matter how liquid the substance, will remain in the chamber due to the sealing of the central chamber 808 by the central post 1000. The sealing is primarily leak proof after the cap 900 is double closed by the child-resistant locking members and the threaded engagement described above.

Referring to FIG. 20, an additional improvement is the affixation of an applicator sponge 840 having a cylindrical body 842, a transverse distal front surface 820 and a proximal rear surface 847. The applicator sponge 840 is affixed at its proximal rear surface 847 to the transverse front surface 820 of nozzle 815. The applicator sponge 840 has a central opening 846 in transverse distal front surface 844. The central opening 846 is aligned with sponge interior shaft 843 which extends through the entire length of the applicator sponge 840 and is aligned with nozzle opening 821. Therefore, aligned fluid passage openings and channels 846, 843, 821, 819 and 802 provide a path so that squeezing of the body 816 will force contents out of opening 846. For sealing, the shaft 1020 of the central post 1000 is inserted through openings 846, 843, 821, 819 and 802. The cap 900 is removably affixed to the container 800 as previously described and the central post 1000 seals the interior chamber 808 as previously described so that any contents within interior chamber 808, no-matter how liquid the substance, will remain in the chamber.

When the sealing cap 900 is inserted over the sponge 840 and nozzle 815, the shaft 1020 of the post 1000 is inserted through aligned openings as discussed. Therefore, the post 1000 prevents any container contents 2000 from seeping out after the container is closed with the child-resistant locking assembly.

As with the other embodiments, the sidewall 816 of the container 800 is made of material selected from the group consisting of rolled laminated plastic and rolled laminated aluminum, each having from one to eight layers of rolled laminated plastic or aluminum. The plastic is selected from the group consisting of polypropylene, polyethylene, polyvinyl or combinations including one or more of these plastics. The rolled laminated material creates a flexible sidewall so that the contents in the container is squeezed out of the interior chamber in other container and dispensed.

The following material is included for the second continuation-in-part application.

Figure 21:
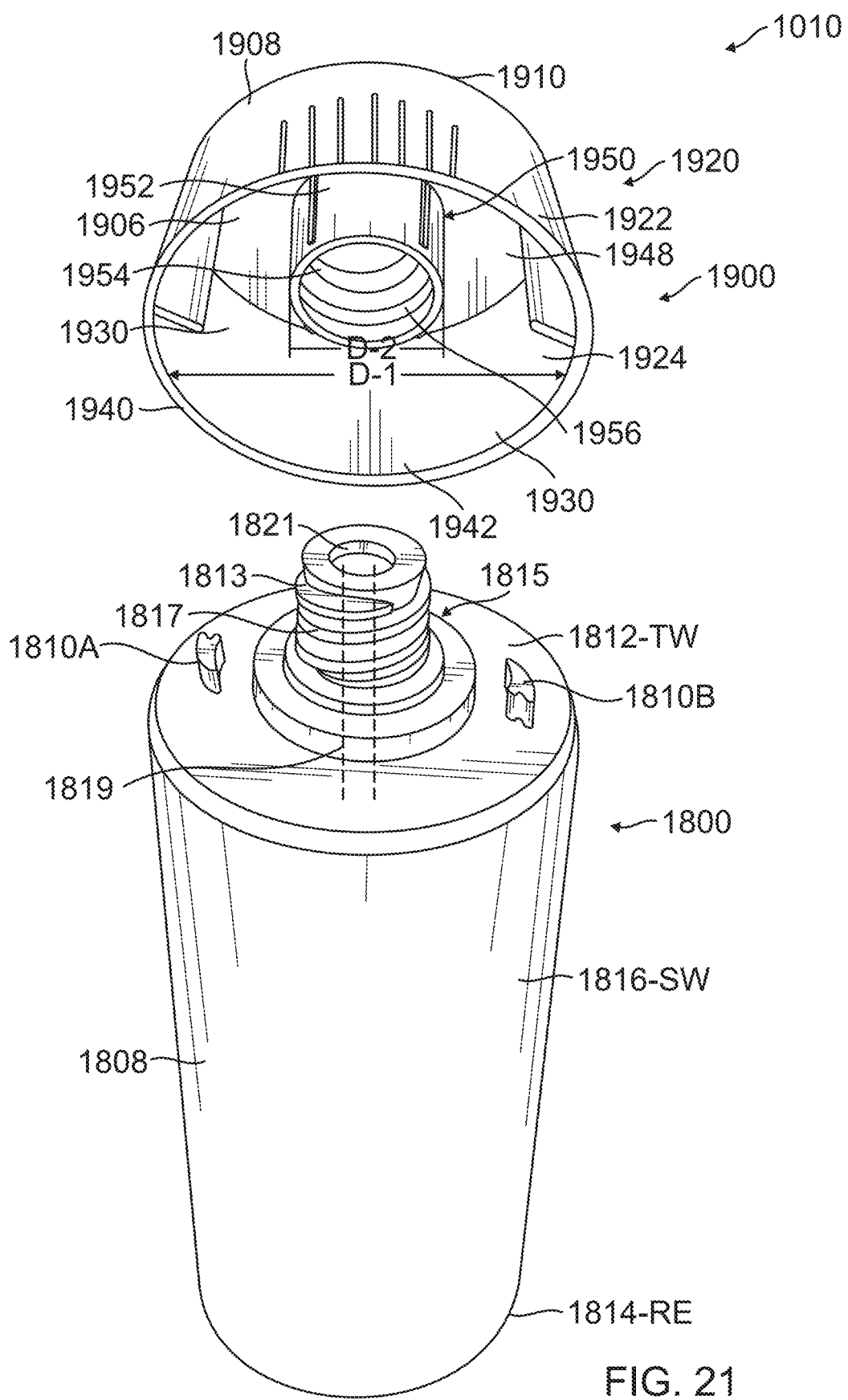
FIG. 21 is an exploded view illustrating a container with a standard threaded nozzle and a pair of oppositely disposed standoffs and a bottom perspective view of a locking cap with a mating threaded cover and a pair of closing teeth.
Figure 22:
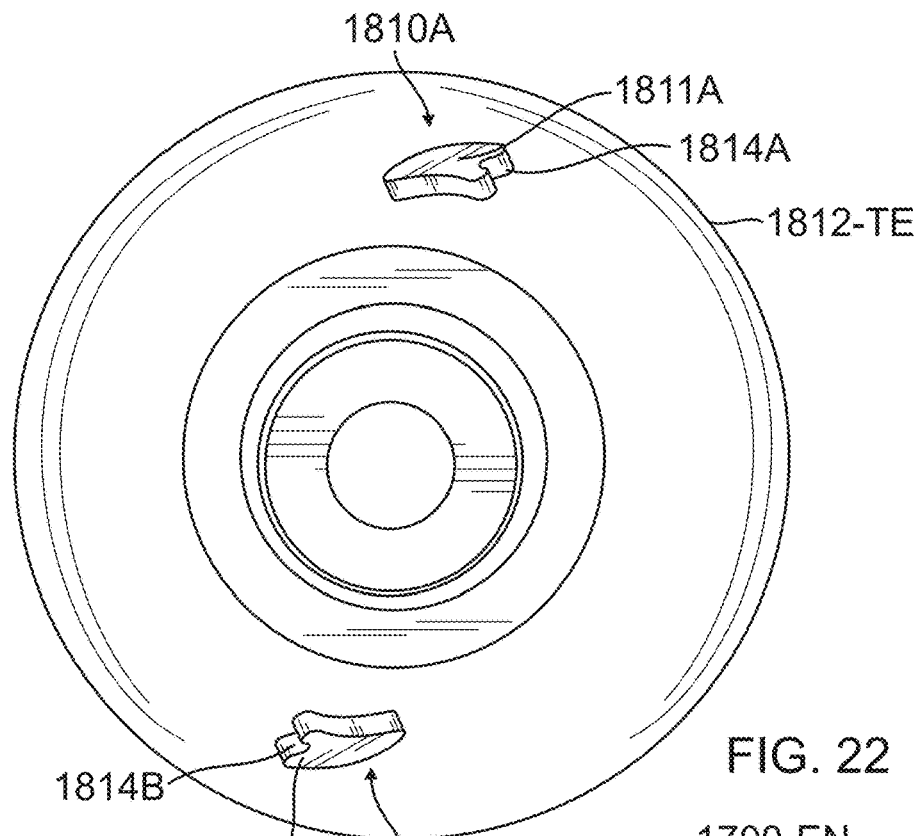
FIG. 22 is a top plan view of the container from FIG. 21 with a central nozzle and a pair of oppositely disposed standoffs.
Figure 23:
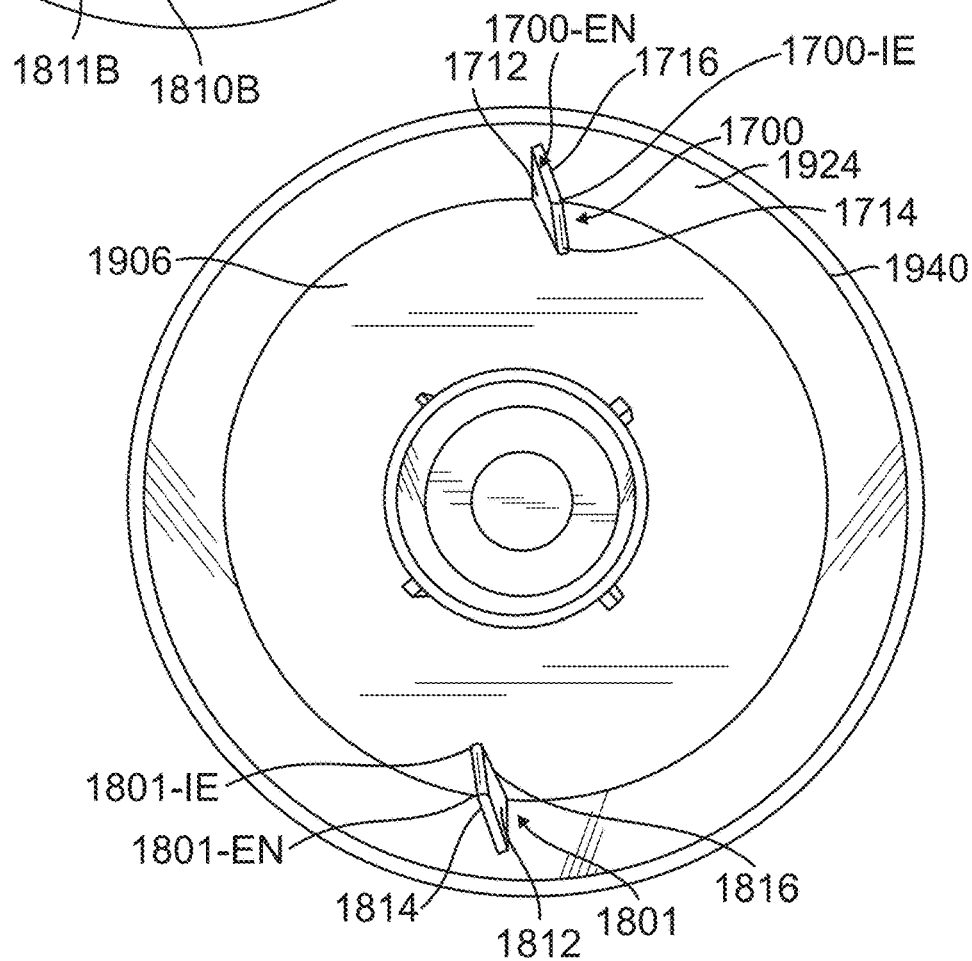
FIG. 23 is a bottom plan view of the closing cap taken from FIG. 21 illustrating the pair of locking teeth.
Figure 24:
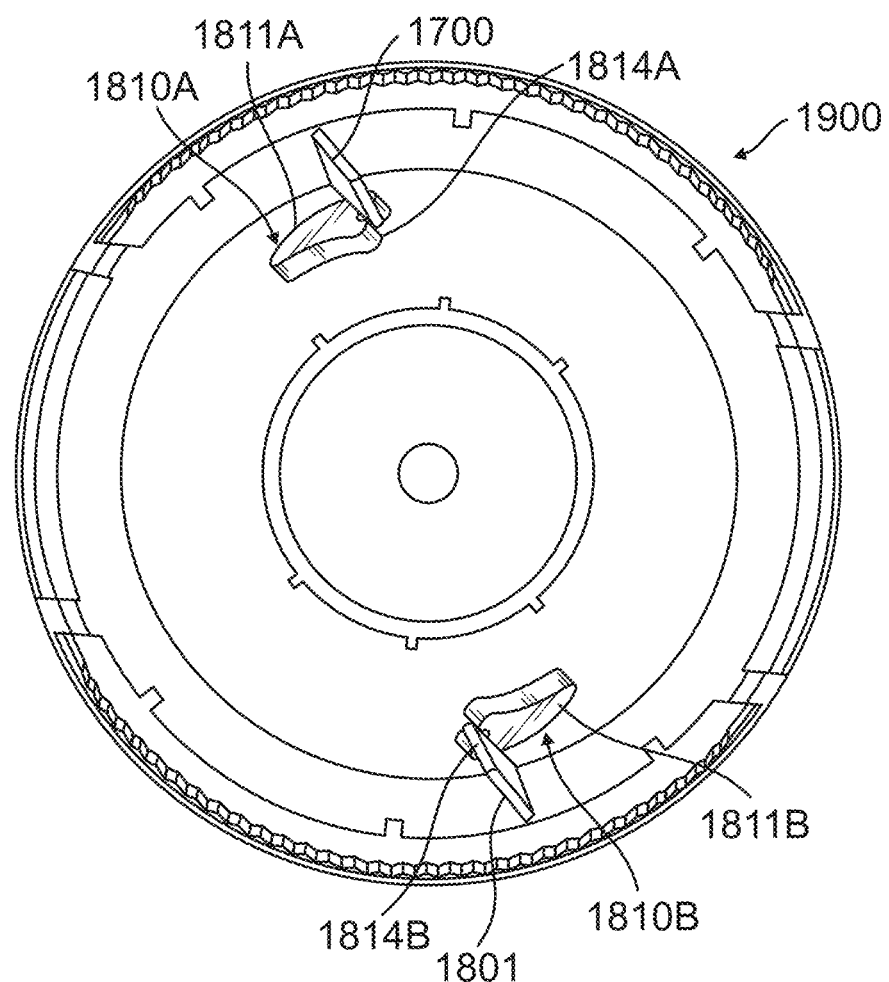
FIG. 24 is a plan view illustrating the closing cap from FIG. 21 with a respective locking tooth engaged with a respective standoff'

Referring to FIG. 21, there is illustrated an exploded view illustrating a container with a standard threaded nozzle and a pair of oppositely disposed standoffs and a bottom perspective view of a closing cap with a mating threaded cover and a pair of locking teeth. Referring to FIG. 22, there is illustrated a top plan view of the container from FIG. 21 with a central nozzle and a pair of oppositely disposed standoffs. Referring to FIG. 23, there is illustrated a bottom plan view of the closing cap taken from FIG. 21 illustrating the pair of locking teeth. Referring to FIG. 24, there is illustrated a plan view illustrating the closing cap from FIG. 21 with a respective locking tooth engaged with a respective standoff.

Referring to FIGS. 21 through 24, there is illustrated the present invention apparatus 1010 which includes the sealing cap 1900 and its components and the container 1800 and its components.

The sealing cap 1900 includes the following components. First, a transverse top wall 1910 having an exterior surface 1908 and an interior surface 1906. The transverse top wall 1910 is integrally formed with an exterior circumferential sidewall 1920 having an exterior surface 1922 and an interior circumferential surface 1924 terminating in a circumferential bottom rim 1940. The respective interior surface 1906 of the transverse top wall 1910 and the circumferential interior sidewall 1924 surround a sealing cap interior chamber 1930 with an open bottom 1942. The sealing cap interior 1930 has a first interior diameter "D-1" of the interior circumferential surface 1924.

Another component of the sealing cap 1900 is a cylindrical closing tube 1950 having a cylindrical exterior wall 1952 affixed to the interior surface 1906 of said transverse top wall 1910 and having a cylindrical interior surface 1954 with a first set of mating threads 1956 therein. The cylindrical closing tube 950 has a second diameter "D-2" which is less than the first diameter and centered within the sealing cap chamber 1930. A circumferential interior space 948 is between said cylindrical wall 952 of the cylindrical closing tube 950 and said interior surface 1924 of the cylindrical sidewall 1920.

Two additional components of the sealing cap 1900 are a first locking tooth 1700 and a second locking tooth 1801. The first locking tooth 1700 has a body 1712 with a top end 1714 affixed to the interior surface 1906 of the transverse top wall 1910 and a bottom end 1716 adjacent an interior of the circumferential bottom rim 1940. The body 1712 of the first locking tooth 1700 is affixed at an interior end 1700-IE to the interior surface 1924 of the circumferential sidewall 1920. The body 1712 extends at an angle relative to the interior sidewall 1924. An interior end 1700-IE of the first locking tooth 1700 is within the cylindrical interior space 1948 of the interior chamber 1930 and spaced apart from the cylindrical exterior wall 1952 of the cylindrical closing tube 950. The second locking tooth 801 has a body 1812 with a top end 1814 affixed to the interior surface 1906 of said transverse top wall 1910 and a bottom end 1816 adjacent an interior of the circumferential bottom rim 1940. The body 1812 of the second locking tooth 1801 is affixed at an interior end 1801-EN to the interior surface 1924 of the circumferential sidewall 1920 and extends at an angle relative to the interior sidewall. An interior end 1801-IE of the second locking tooth 1801 is within the cylindrical interior space 1948 of the interior chamber 1930 and is spaced apart from the cylindrical exterior wall 1952 of said cylindrical closing tube 1950 The first locking tooth 1700 and the second locking tooth 1801 are affixed one-hundred and eighty degrees apart and extend at opposite angles relative to the circumferential interior sidewall 1924.

The container 1800 is formed with a closed rear end 1814-RE, an exterior sidewall 1816-SW and a transverse top wall 1812-TW surrounding an interior chamber 1808. A centrally located dispensing nozzle 1815 is integrally formed with the transverse top wall 1812-TW and has a threaded vertical wall 1813 with mating threads 1817 on the threaded vertical wall 1813. The dispensing nozzle 1815 includes a longitudinal interior shaft 1819 extending into the transverse top wall 1812-TW. The longitudinal interior shaft 1819 leads to the interior chamber 1808 of the container 1800. At the opposite end, the longitudinal interior shaft ends in a distal central opening 1821.

The transverse top wall 1812-TW of the container 1800 further including a first standoff 1810A affixed to the transverse top wall 1812-TW of the container 1800 and located between the dispensing nozzle 1815 and a top circumferential edge 1812-TE of the transverse top wall 1812-TW. The first standoff 1810A has a first body 1811A with a first cavity 1814A extending into the first body 1811A. An opposite second standoff 1810B is affixed to the transverse top wall 1812-TW of the container 1800 and located between the dispensing nozzle 1815 and the top circumferential edge 1812-TE of the front wall 1812-TW. The second standoff 1810B has a second body 1811B with a second cavity 1814B extending into the second body 1811B. The first standoff 1810A and the second standoff 1810B are located on opposite sides of the dispensing nozzle 1815.

The sealing cap 1900 is removably affixed to the dispensing nozzle 1815 with the threads 1956 on the cylindrical closing tube 1950 threaded onto the mating threads 1819 on the threaded vertical wall 1813 of the dispensing nozzle 1815 so that the distal opening 1821 of the dispensing nozzle 1815 is closed by the interior surface of the sealing cap transverse wall 1910 and rotating of the sealing cap 1900 causes the first locking tooth 1700 to engage the cavity 1814A of said first standoff 1810A and the second locking tooth 1801 engages the cavity 1814B of the second standoff 1810B.

Therefore, a simultaneous inward pressure on the exterior surface 1922 of the circumferential sidewall 1920 of said sealing cap 1900 at locations adjacent the first locking tooth 1700 and the second locking tooth 1801 disengages the first locking tooth 1700 from the first cavity 1814A of the first standoff 1810A the disengage the second locking tooth 1801 from the second cavity 1814B of said second standoff 1810B and a reverse rotation of the sealing cap unthreads the cylindrical closing tube 1950 from the dispensing nozzle 1815.

The apparatus described above is partially formed in a shape selected from the group consisting of oval-shaped, elliptical-shaped and cylindrical-shaped.

The sidewall of the container of the above apparatus is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

Figure 25:
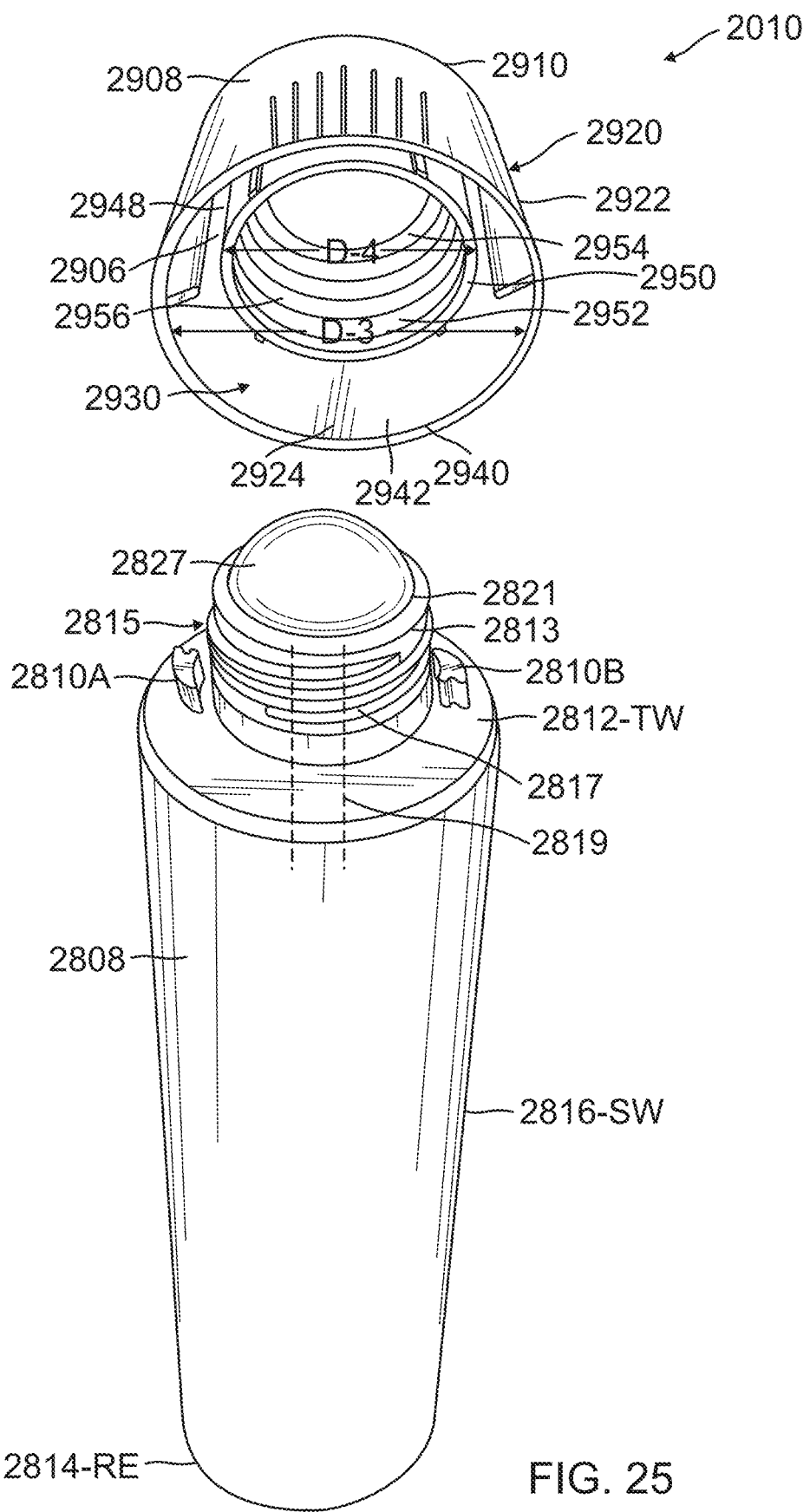
FIG. 25 is an exploded view illustrating a container with a standard threaded nozzle including a rollerball applicator and a pair of oppositely disposed standoffs and a bottom perspective view of a closing cap with a mating threaded cover and a pair of locking teeth.
Figure 26:
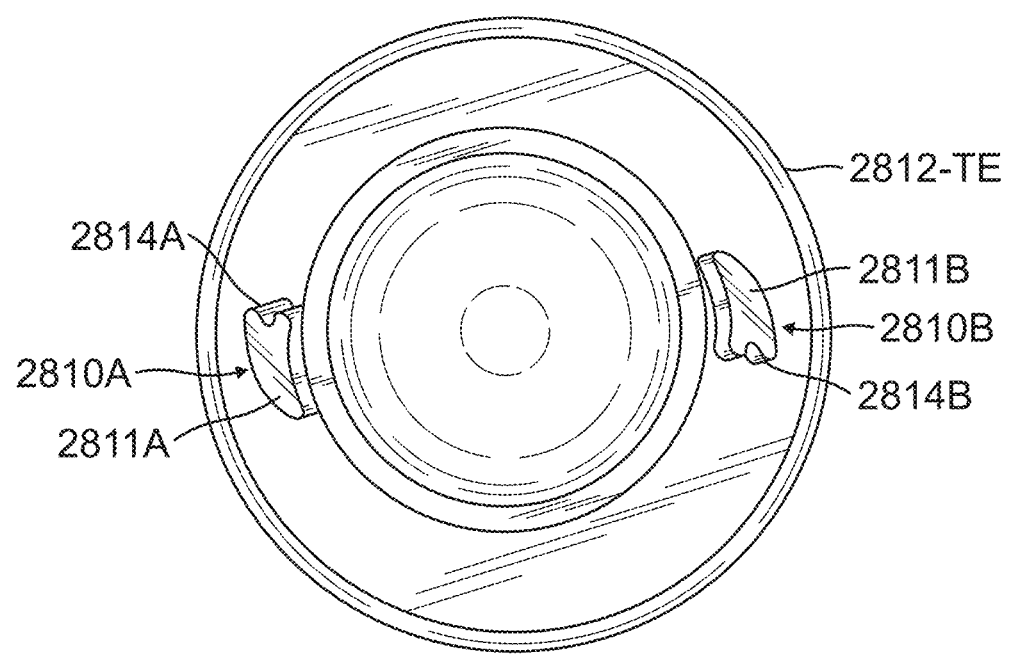
FIG. 26 is a top plan view of the container from FIG. 25 with a central nozzle including a rollerball applicator and a pair of oppositely disposed standoffs.
Figure 27:
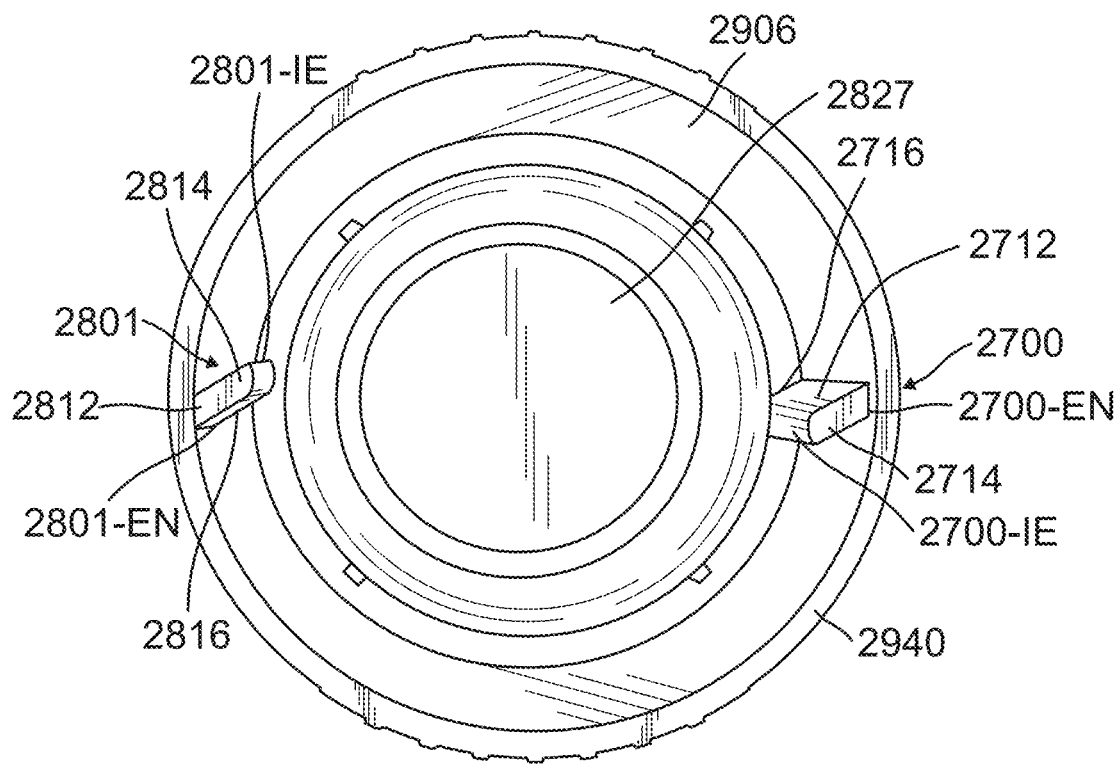
FIG. 27 is a bottom plan view of the closing cap taken from FIG. 25 illustrating the pair of locking teeth.
Figure 28:
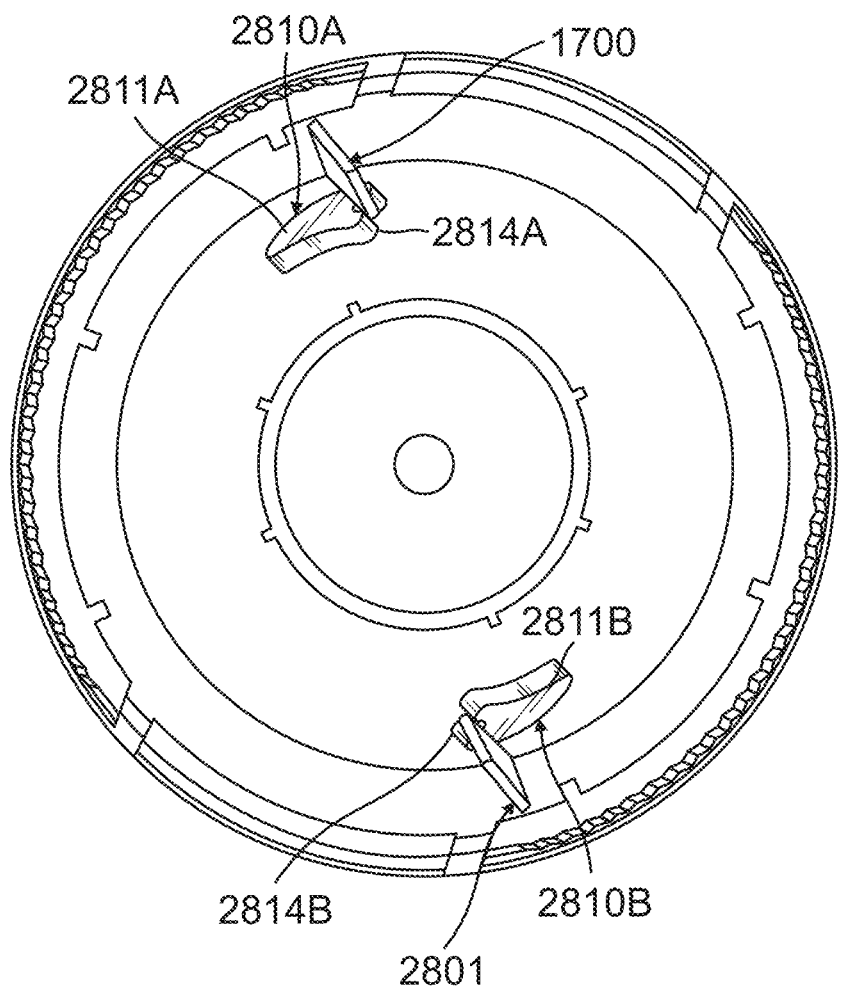
FIG. 28 is a plan view illustrating the closing cap from FIG. 25 with a respective locking tooth engaged with a respective standoff.

Referring to FIG. 25, there is illustrated an exploded view illustrating a container with a standard threaded nozzle including a rollerball applicator and a pair of oppositely disposed standoffs and a bottom perspective view of a closing cap with a mating threaded cover and a pair of locking teeth. Referring to FIG. 26, there is illustrated a top plan view of the container from FIG. 25 with a central nozzle and a pair of oppositely disposed standoffs. Referring to FIG. 27, there is illustrated a bottom plan view of the closing cap taken from FIG. 25 illustrating the pair of locking teeth. Referring to FIG. 28, there is illustrated a plan view illustrating the closing cap from FIG. 25 with a respective locking tooth engaged with a respective standoff.

Referring to FIGS. 25 through 28, there is illustrated the present invention apparatus 2010 which includes the sealing cap 2900 and its components and the container 2800 and its components.

The sealing cap 2900 includes the following components. First, a transverse top wall 2910 having an exterior surface 2908 and an interior surface 2906. The transverse top wall 2910 is integrally formed with an exterior circumferential sidewall 2920 having an exterior surface 2922 and an interior circumferential surface 2924 terminating in a circumferential bottom rim 2940. The respective interior surface 2906 of the transverse top wall 2910 and the circumferential interior sidewall 2924 surround a sealing cap interior chamber 2930 with an open bottom 2942. The sealing cap interior 2930 has a first interior diameter "D-3" of the interior circumferential surface 2924.

Another component of the sealing cap 2900 is a cylindrical closing tube 2950 having a cylindrical exterior wall 2952 affixed to the interior surface 2906 of said transverse top wall 2910 and having a cylindrical interior surface 2954 with a first set of mating threads 2956 therein. The cylindrical closing tube 2950 has a second diameter "D-4" which is less than the first diameter and centered within the sealing cap chamber 2930. A circumferential interior space 2948 is between said cylindrical wall 2952 of the cylindrical closing tube 2950 and said interior surface 2924 of the cylindrical sidewall 2920.

Two additional components of the sealing cap 2900 are a first locking tooth 2700 and a second locking tooth 2801. The first locking tooth 2700 has a body 2712 with a top end 2714 affixed to the interior surface 2906 of the transverse top wall 2910 and a bottom end 2716 adjacent an interior of the circumferential bottom rim 2940. The body 2712 of the first locking tooth 2700 is affixed at an interior end 2700-EN to the interior surface 2924 of the circumferential sidewall 2920. The body 2712 extends at an angle relative to the interior sidewall 2124. An interior end 2700-IE of the first locking tooth 2700 is within the cylindrical interior space 2948 of the interior chamber 2930 and spaced apart from the cylindrical exterior wall 2952 of the cylindrical closing tube 2950. The second locking tooth 2801 has a body 2812 with a top end 2814 affixed to the interior surface 2906 of said transverse top wall 2910 and a bottom end 2816 adjacent an interior of the circumferential bottom rim 2940. The body 2812 of the second locking tooth 2801 is affixed at an interior end 2801-EN to the interior surface 2924 of the circumferential sidewall 2920 and extends at an angle relative to the interior sidewall. An interior end 2801-IE of the second locking tooth 2801 is within the cylindrical interior space 2948 of the interior chamber 2930 and is spaced apart from the cylindrical exterior wall 2952 of said cylindrical closing tube 2950 The first locking tooth 2700 and the second locking tooth 2801 are affixed one-hundred and eighty degrees apart and extend at opposite angles relative to the circumferential interior sidewall 2924.

The container 2800 is formed with a closed rear end 2814-RE, an exterior sidewall 2816-SW and a transverse top wall 2812-TW surrounding an interior chamber 2808. A centrally located dispensing nozzle 2815 is integrally formed with the transverse top wall 2812-TW and has a threaded vertical wall 2813 with mating threads 2817 on the threaded vertical wall 2813. The dispensing nozzle 2815 includes a longitudinal interior shaft 2819 extending into the transverse top wall 2812-TW with a distal central opening 2821. The longitudinal interior shaft 2819 leads to the interior chamber 2808 of the container 2800. The dispensing nozzle 2815 further includes a rollerball applicator 2827 within the longitudinal shaft 2819 adjacent a distal central opening 2821.

The transverse top wall 2812-TW of the container 2800 further including a first standoff 2810A affixed to the top wall 2812-TW of the container 2800 and located between the dispensing nozzle 2815 and a top circumferential edge 2812-TE of the front wall 2812A. The first standoff 2810A has a first body 2811A with a first cavity 2814A extending into the first body 2811A. An opposite second standoff 2810B is affixed to the top wall 2812-TW of the container 2800 and located between the dispensing nozzle 2815 and the top circumferential edge 2812-TE of the front wall 2812-TW. The second standoff 2810B has a second body 2811B with a second cavity 2814B extending into the second body 2811B. The first standoff 2810A and the second standoff 2810B are located on opposite sides of the dispensing nozzle 2815.

The sealing cap 2900 is removably affixed to the dispensing nozzle 2815 with the threads 2956 on the cylindrical closing tube 2950 threaded onto the mating threads 2817 on the threaded vertical wall 2813 of the dispensing nozzle 2815 so that the distal opening 2821 of the dispensing nozzle 2815 is closed by the interior surface of the sealing cap transverse wall 2910 and rotating of the sealing cap 2900 causes the first locking tooth 2700 to engage the cavity 2814A of said first standoff 2810A and causes the second locking tooth 2801 to engage the cavity 2814B of the second standoff 2810B.

Therefore, a simultaneous inward pressure on the exterior surface 2922 of the circumferential sidewall 2920 of said sealing cap 2900 at locations adjacent the first locking tooth 2700 and the second locking tooth 2801 disengages the first locking tooth 2700 from the first cavity 2814A of the first standoff 2810A the disengage the second locking tooth 2801 from the second cavity 2814B of said second standoff 2810B and a reverse rotation of the sealing cap unthreads the cylindrical closing tube 2950 from the dispensing nozzle 2815.

The apparatus described above is partially formed in a shape selected from the group consisting of oval-shaped, elliptical-shaped and cylindrical-shaped.

The sidewall of the container of the above apparatus is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

Figure 29:
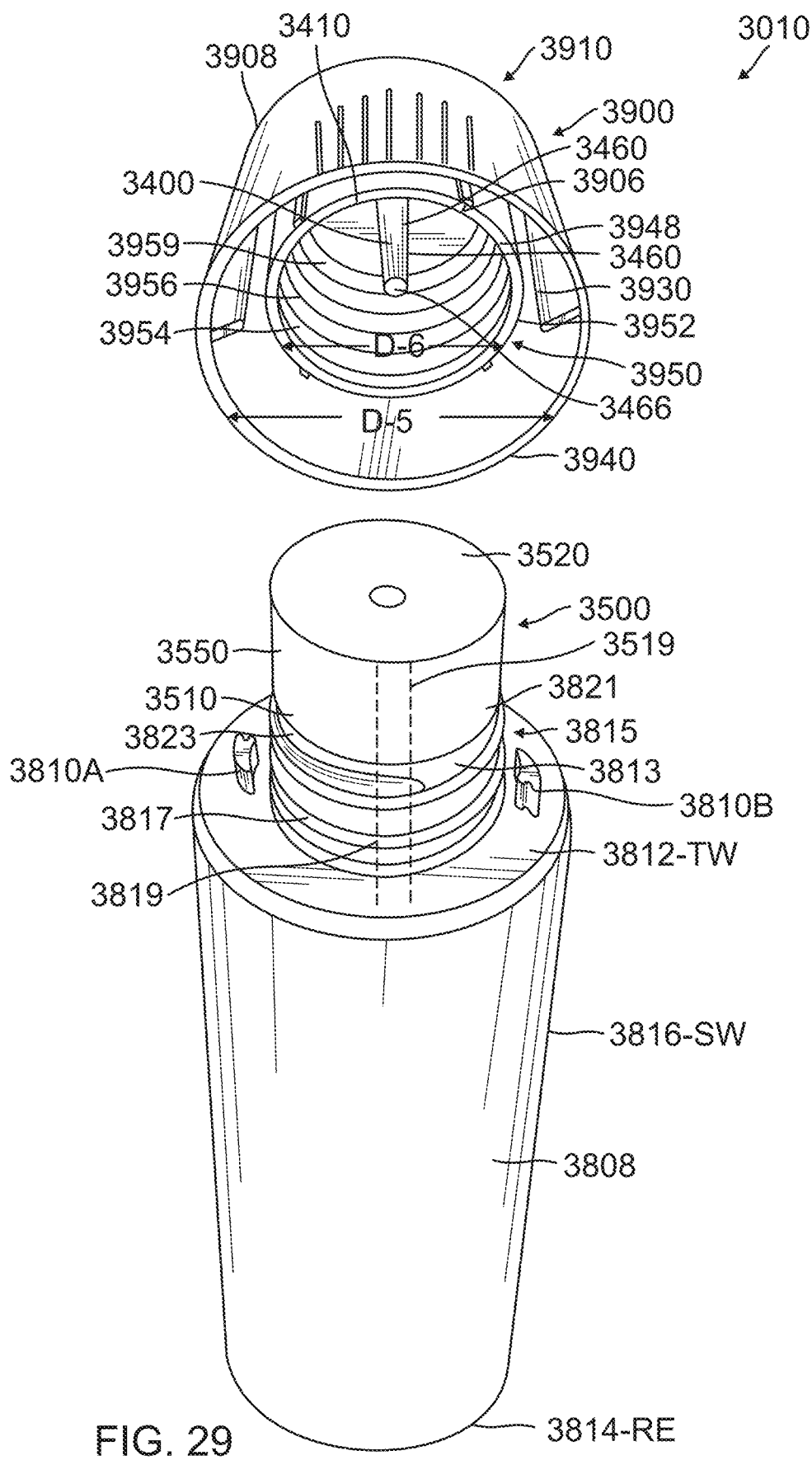
FIG. 29 is an exploded view illustrating a container with a standard threaded nozzle including a sponge above the nozzle and a pair of oppositely disposed standoffs and a bottom perspective view of a locking cap with a mating threaded cover and a central sealing post and a pair of locking teeth.
Figure 30:
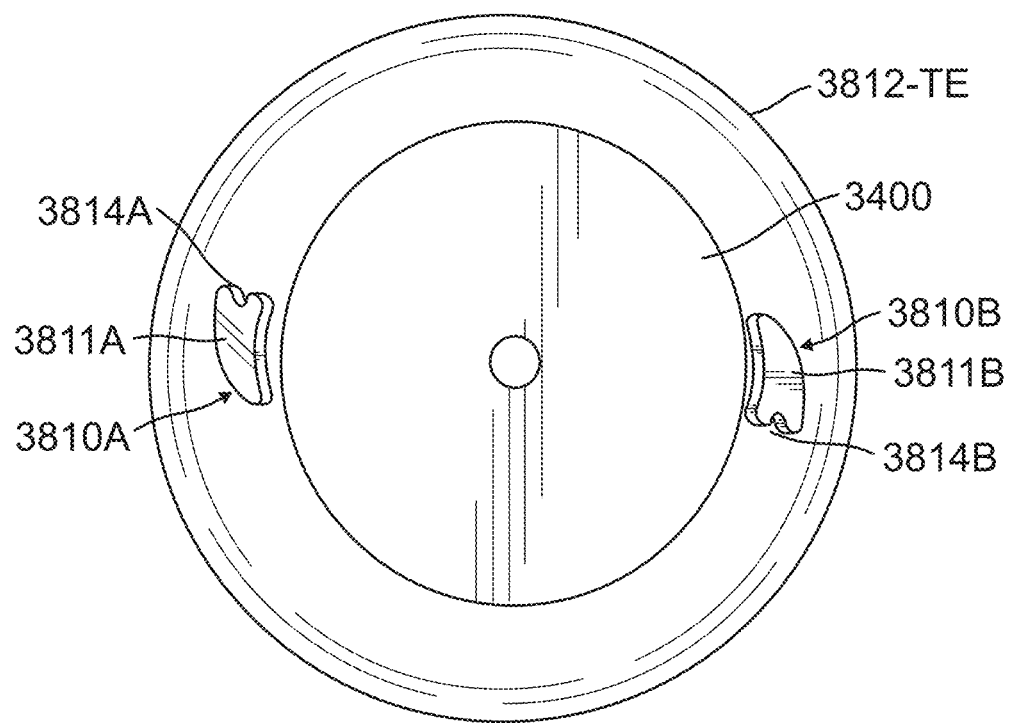
FIG. 30 is a top plan view of the container from FIG. 29 with a central nozzle and sponge and a pair of oppositely disposed standoffs.
Figure 31:
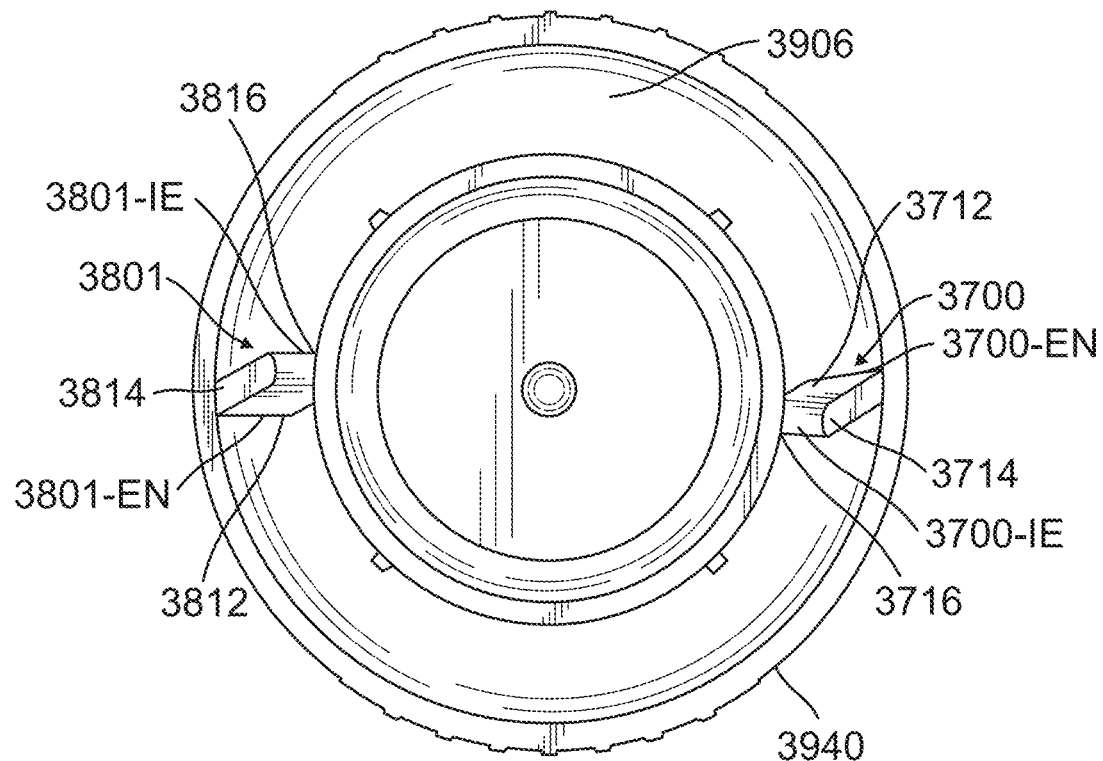
FIG. 31 is a bottom plan view of the closing cap taken from FIG. 29 illustrating the sealing post and the pair of locking teeth.
Figure 32:
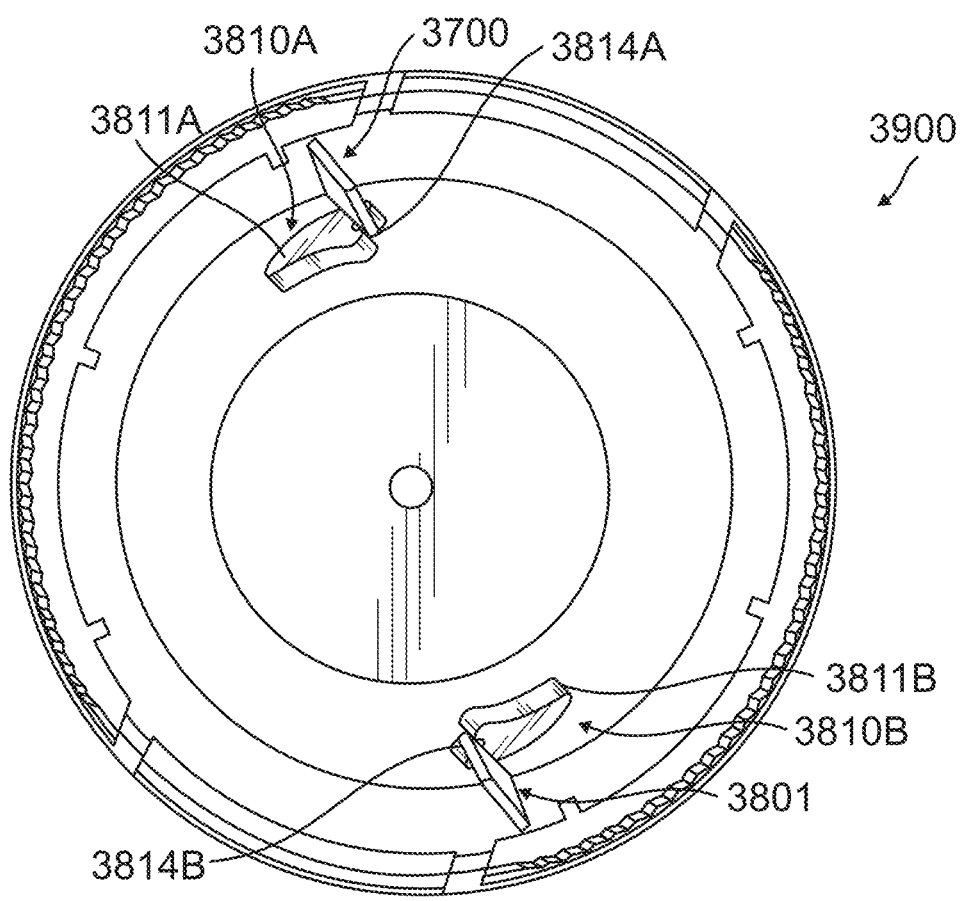
FIG. 32 is a plan view illustrating the closing cap from FIG. 259 with a respective locking tooth off engaged with a respective standoff.

Referring to FIG. 29, there is illustrated an exploded view illustrating a container with a standard threaded nozzle including a sponge above the nozzle and a pair of oppositely disposed standoffs and a bottom perspective view of a closing cap with a mating threaded cover and a central sealing post and a pair of locking teeth Referring to FIG. 30, there is illustrated a top plan view of the container from FIG. 29 with a central nozzle and sponge and a pair of oppositely disposed standoffs. Referring to FIG. 31, there is illustrated a bottom plan view of the closing cap taken from FIG. 29 illustrating the sealing post and a pair of locking teeth. Referring to FIG. 32, there is illustrated a plan view illustrating the closing cap from FIG. 29 with a respective locking tooth engaged with a respective standoff.

Referring to FIGS. 29 through 32, there is illustrated the present invention apparatus 3010 which includes the sealing cap 3900 and its components and the container 3800 and its components.

The sealing cap 3900 includes the following components. First, a transverse top wall 3910 having an exterior surface 3908 and an interior surface 3906. The transverse top wall 3910 is integrally formed with an exterior circumferential sidewall 3920 having an exterior surface 3922 and an interior circumferential surface 3924 terminating in a circumferential bottom rim 3940. The respective interior surface 3906 of the transverse top wall 3910 and the circumferential interior sidewall 3924 surround a sealing cap interior chamber 3930 with an open bottom 3942, a central longitudinal post 3400 having a proximal end 3410 integrally formed at a center of the interior surface 3906 of the top transverse wall 3910 which corresponds with the center of the sealing cap 3900, the central longitudinal post 3400 includes an elongated shaft 3460 terminating at a distal end 3466. The sealing cap interior 3930 has a first interior diameter "D-5" of the interior circumferential surface 3924.

Another components of the sealing cap 3900 is a cylindrical closing tube 3950 having a cylindrical exterior wall 3952 affixed to the interior surface 3906 of said transverse top wall 3910 and having a cylindrical interior surface 3954 with a first set of mating threads 3956 therein. The cylindrical closing tube 3950 has a second diameter "D-6" which is less than the first diameter and centered within the sealing cap chamber 3930. A circumferential interior space 3948 is between said cylindrical wall 3952 of the cylindrical closing tube 3950 and said interior surface 3924 of the cylindrical sidewall 3920.

Two additional components of the sealing cap 3900 are a first locking tooth 3700 and a second locking tooth 3801. The first locking tooth 3700 has a body 3712 with a top end 3714 affixed to the interior surface 3906 of the transverse top wall 3910 and a bottom end 3716 adjacent an interior of the circumferential bottom rim 3940. The body 3712 of the first locking tooth 3700 is affixed at an interior end 3710-EN to the interior surface 3924 of the circumferential sidewall 3920. The body 3712 extends at an angle relative to the interior sidewall 3924. An interior end 3700-IE of the first locking tooth 3700 is within the cylindrical interior space 3948 of the interior chamber 3930 and spaced apart from the cylindrical exterior wall 3952 of the cylindrical closing tube 3950. The second locking tooth 3801 has a body 3812 with a top end 3814 affixed to the interior surface 3906 of said transverse top wall 3910 and a bottom end 3816 adjacent an interior of the circumferential bottom rim 3940. The body 3812 of the second locking tooth 3801 is affixed at an interior end 3801-EN to the interior surface 3924 of the circumferential sidewall 3920 and extends at an angle relative to the interior sidewall. An interior end 3801-IE of the second locking tooth 3801 is within the cylindrical interior space 3948 of the interior chamber 3930 and is spaced apart from the cylindrical exterior wall 3952 of said cylindrical closing tube 3950 The first locking tooth 3700 and the second locking tooth 3801 are affixed one-hundred and eighty degrees apart and extend at opposite angles relative to the circumferential interior sidewall 3924.

The container 3800 is formed with a closed rear end 3814-RE, an exterior sidewall 3816-SW and a transverse top wall 3812-TW surrounding an interior chamber 3808. A centrally located dispensing nozzle 3815 is integrally formed with the transverse top wall 3812-TW and has a threaded vertical wall 3813 with mating threads 3817 on the threaded vertical wall 3813. The dispensing nozzle 3815 includes a longitudinal interior shaft 3819 extending into the transverse top wall 3812-TW with a distal central opening 3821. The longitudinal interior shaft 3819 leads to the interior chamber 3808 of the container 3800. In addition, a cylindrical sponge 3500 has a transverse proximal rear surface 3510, a cylindrical body 3550 and a transverse distal front surface 3520. The transverse proximal rear surface 3510 of the cylindrical sponge 3500 is affixed to the distal transverse front wall 3823 of the dispensing nozzle 3815. The cylindrical sponge 3500 also includes an interior shaft 3519 extending from the distal front surface 3823 to the proximal rear surface 3510 and aligned with the proximal interior shaft 3819 of the dispensing nozzle.

The transverse top wall 3812-TW of the container 3800 further including a first standoff 3810A affixed to the top wall of the container 3800 and located between the dispensing nozzle 3815 and a top circumferential edge 3812-TE of the transverse top wall 3812-TW. The first standoff 3810A has a first body 3811A with a first cavity 3814A extending the first body 3811A. An opposite second standoff 3810B is affixed to the transverse top wall 3812-TW of the container 3800 and located between the dispensing nozzle 3815 and the top circumferential edge 3812-TE of the front wall 3812A. The second standoff 3810B has a second body 3812B with a second cavity 3814B extending into the second body 3812B. The first standoff 3810A and the second standoff 3810B are located on opposite sides of the dispensing nozzle 3815.

The sealing cap 3900 is removably affixed to the dispensing nozzle 3815 with the threads 3956 on the cylindrical closing tube 3950 threaded onto the mating threads 3819 on the threaded vertical wall 3813 of the dispensing nozzle 3815 so that the distal opening 3821 of the dispensing nozzle 3815 is closed by the interior surface of the sealing cap transverse wall 3910 and the central post 3400 of the sealing cap 3900 is also inserted through the aligned central shaft 3519 of the cylindrical sponge 3500 and the aligned central shaft 3819 of the dispensing nozzle 3815 to further seal the container 3800 and rotating of the sealing cap 3900 causes the first locking tooth 3700 to engage the cavity 3814A of said first standoff 3810A and the second locking tooth 3801 to engage the cavity 3814B of the second standoff 3810B.

Therefore, a simultaneous inward pressure on the exterior surface 3922 of the circumferential sidewall 3920 of said sealing cap 3900 at locations adjacent the first locking tooth 3700 and the second locking tooth 3801 disengages the first locking tooth 3700 from the first cavity 3814A of the first standoff 3810A the disengage said second locking tooth 3801 from said second cavity 3814B of said second standoff 3810B and a reverse rotation of the sealing cap unthreads the cylindrical closing tube 3950 from the dispensing nozzle 3815.

The apparatus described above is partially formed in a shape selected from the group consisting of oval-shaped, elliptical-shaped and cylindrical-shaped.

The sidewall of the container of the above apparatus is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

Figure 33:
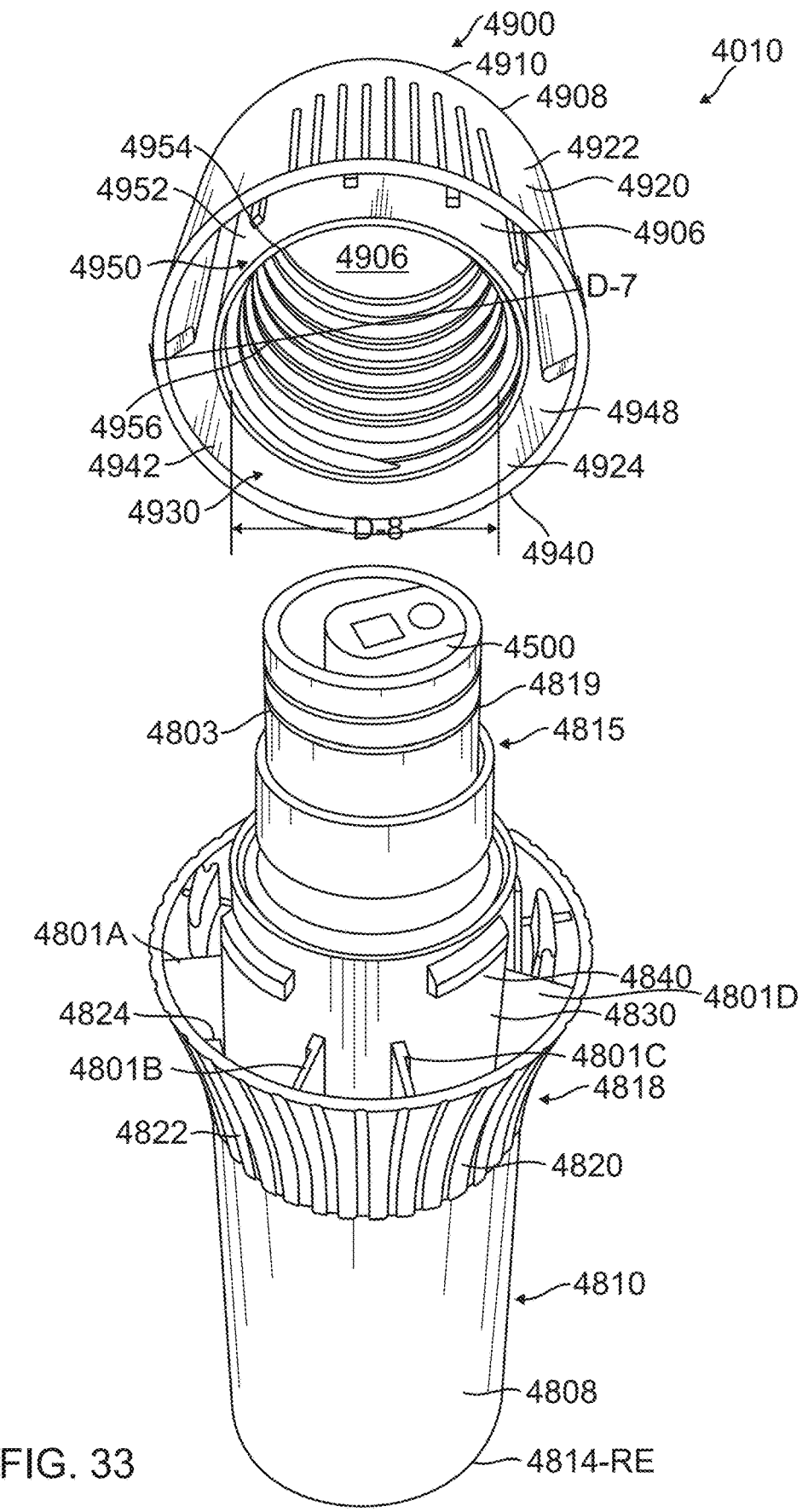
FIG. 33 is an exploded view illustrating an expanded shape container with a snap closure nozzle with a sponge top and a pair of oppositely disposed standoffs and a bottom perspective view of a closing cap with a threaded closing portion and a pair of locking teeth.
Figure 34:
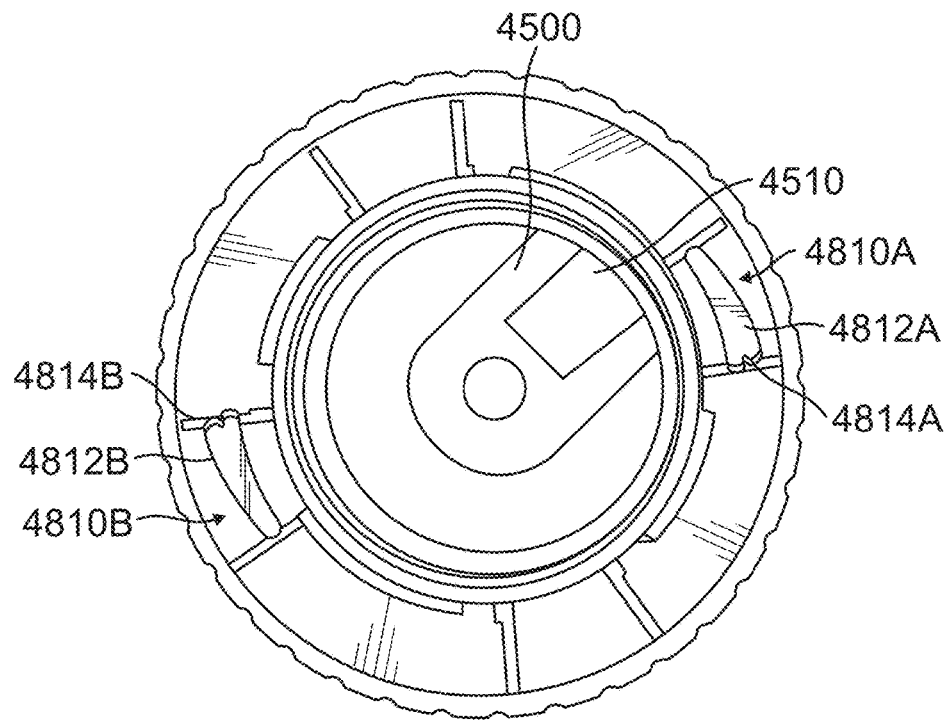
FIG. 34 is a top plan view of the container from FIG. 33 with a central nozzle and sponge and a pair of oppositely disposed standoffs.
Figure 35:
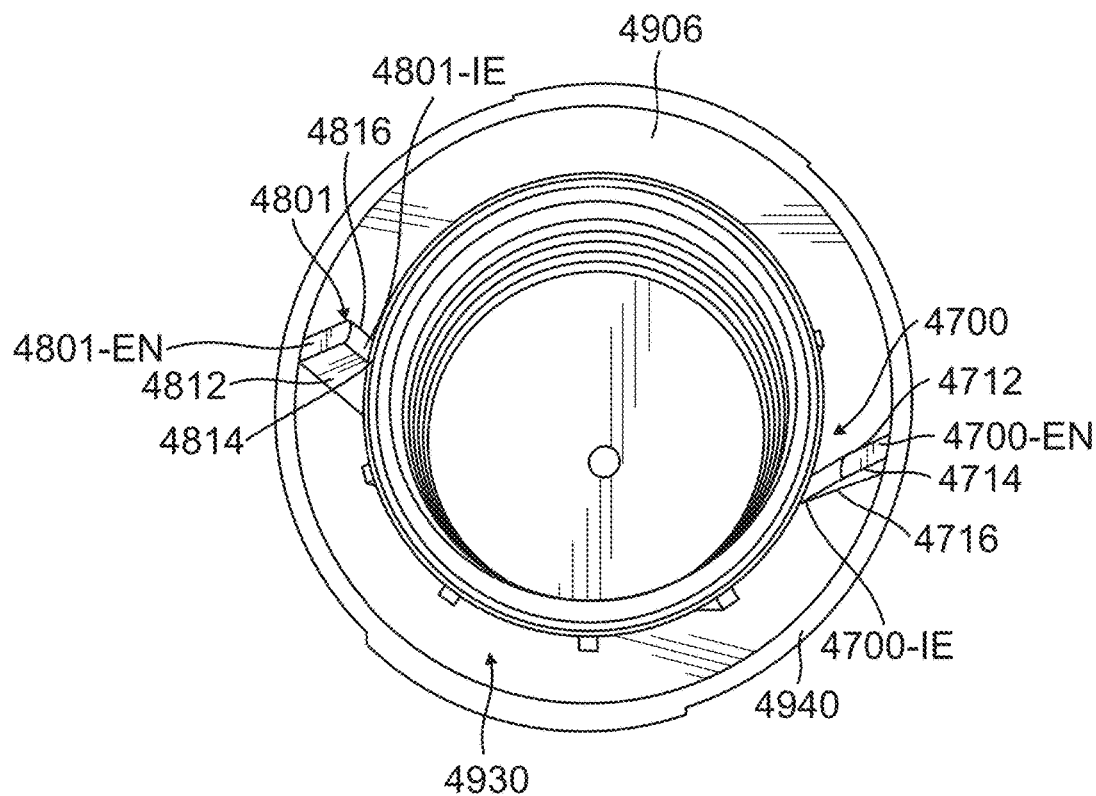
FIG. 35 is a top plan view of the closing cap taken from FIG. 33 and the pair of locking teeth.
Figure 36:
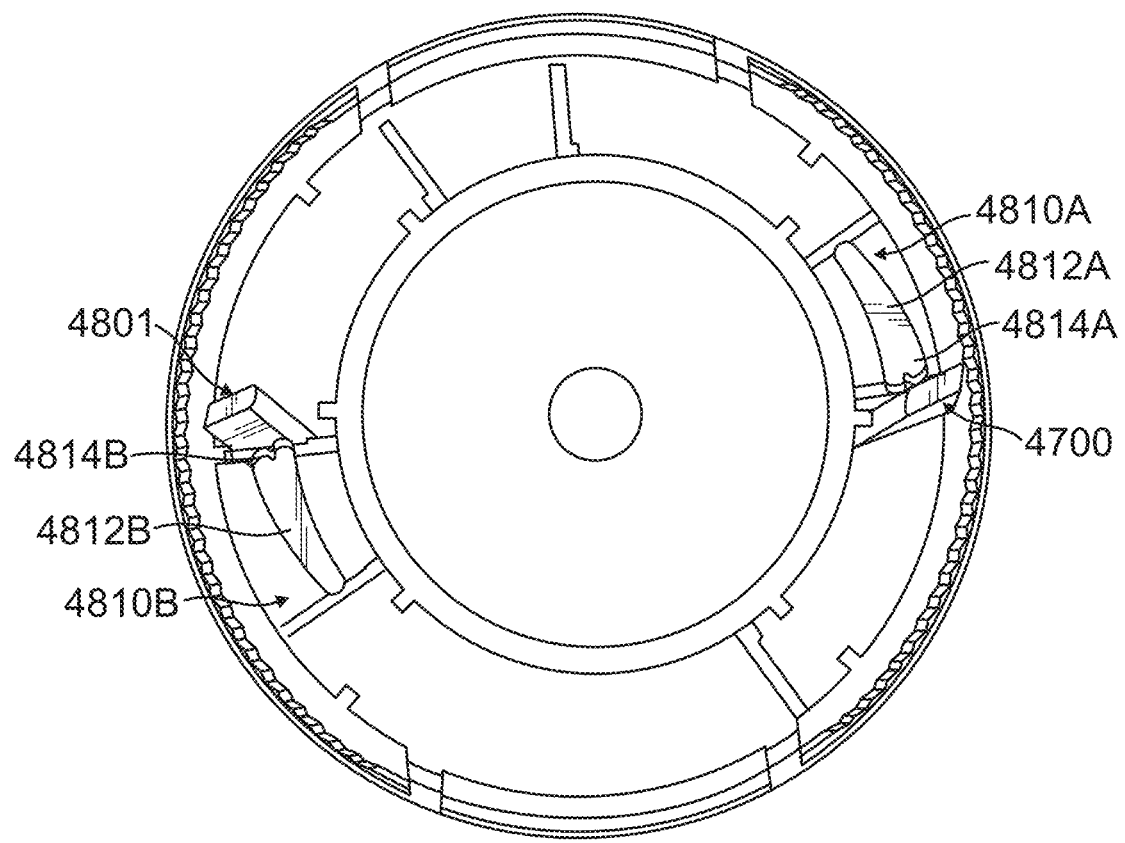
FIG. 36 is a plan view illustrating the closing cap from FIG. 33 with a respective locking tooth engaged with a respective standoff.

Referring to FIG. 33, there is illustrated an exploded view of an expanded shape container with a snap closure nozzle with a dispensing top and a pair of oppositely disposed standoffs and a bottom perspective view of a closing cap with a threaded closing portion and a pair of locking teeth. Referring to FIG. 34, there is illustrated a top plan view of the container from FIG. 33 with a central nozzle and sponge and a pair of oppositely disposed standoffs. Referring to FIG. 35, there is illustrated a bottom plan view of the closing cap taken from FIG. 33 and the pair of locking teeth. Referring to FIG. 36, there is illustrated a plan view illustrating the closing cap from FIG. 33 with a respective locking tooth engaged with a respective standoff.

Referring to FIGS. 33 through 36, there is illustrated the present invention apparatus 4010 which includes the sealing cap 4900 and its components and the container 4800 and its components.

The sealing cap 4900 includes the following components. First, a transverse top wall 4910 having an exterior surface 4908 and an interior surface 4906. The transverse top wall 4910 is integrally formed with an exterior circumferential sidewall 4920 having an exterior surface 4922 and an interior circumferential surface 4924 terminating in a circumferential bottom rim 4940. The respective interior surface 4906 of the transverse top wall 4910 and the circumferential interior sidewall 4924 surround a sealing cap interior chamber 4930 with an open bottom 4942. The sealing cap interior 4930 has a first interior diameter "D-7" of the interior circumferential surface 4924.

Another components of the sealing cap 4900 is a cylindrical closing tube 4950 having a cylindrical exterior wall 4952 affixed to the interior surface 4906 of said transverse top wall 4910 and having a cylindrical interior surface 4954 with a first set of mating threads 4956 therein. The cylindrical closing tube 4950 has a second diameter "D-8" which is less than the first diameter and centered within the sealing cap chamber 4930. A circumferential interior space 4948 is between said cylindrical wall 4952 of the cylindrical closing tube 4950 and said interior surface 4924 of the cylindrical sidewall 4920.

Two additional components of the sealing cap 4900 are a first locking tooth 4700 and a second locking tooth 4801. The first locking tooth 4700 has a body 4712 with a top end 4714 affixed to the interior surface 4906 of the transverse top wall 4910 and a bottom end 4716 adjacent an interior of the circumferential bottom rim 4940. The body 4712 of the first locking tooth 4700 is affixed at an interior end 4700-EN to the interior surface 4924 of the circumferential sidewall 4920. The body 4712 extends at an angle relative to the interior sidewall 4924. An interior end 4700-IE of the first locking tooth 4700 is within the cylindrical interior space 4948 of the interior chamber 4930 and spaced apart from the cylindrical exterior wall 4952 of the cylindrical closing tube 4950. The second locking tooth 4801 has a body 4812 with a top end 4814 affixed to the interior surface 4906 of said transverse top wall 4910 and a bottom end 4816 adjacent an interior of the circumferential bottom rim 4940. The body 4812 of the second locking tooth 4801 is affixed at an interior end 4801-EN to the interior surface 4924 of the circumferential sidewall 4920 and extends at an angle relative to the interior sidewall. An interior end 4801-IE of the second locking tooth 4801 is within the cylindrical interior space 4948 of the interior chamber 4930 and is spaced apart from the cylindrical exterior wall 4952 of said cylindrical closing tube 4950. The first locking tooth 4700 and the second locking tooth 4801 are affixed one-hundred and eighty degrees apart and extend at opposite angles relative to the circumferential interior sidewall 4924.

The container 4800 is formed with a closed rear end 4814-RE extending to a lower exterior cylindrical sidewall 4810 extending to an outwardly flared sidewall 4818 with an exterior surface 4820 with a multiplicity of spaced apart ribs 4822 and a flared interior surface 4824. In addition, a centrally located dispensing nozzle 4815 is integrally formed with a central chamber 4830 with an exterior surface 4840 and a multiplicity of supporting spacer members 4801A, 4801B, 4801C 4801D between exterior surface 4830 and the flared interior surface 4824. In addition, a spray nozzle 4500 is affixed to the centrally located dispensing nozzle 4815 and in fluid communication with contents within an interior chamber 4808 within the centrally located dispensing nozzle 4815.

A first standoff 4810A is affixed within the flared sidewall 4818 and located between the centrally located dispensing nozzle 4815 and the flared interior surface 4824. The first standoff 4810A has a first body 4812A with a first cavity 4814A extending from a surface of the first body into the first body 4812A. An opposite second standoff 4810B is affixed within the flared sidewalls 4818 and located between the centrally located dispensing nozzle 4815 and the flared interior surface 4924. The second standoff 4810B has a second body 4812B with a second cavity 4814A extending from a surface of the second body into the second body 4812B. The first standoff 4810A and the second standoff 4810B are located on opposite sides of the centrally located dispensing nozzle 4815.

The sealing cap 4900 is removably affixed to the dispensing nozzle 4815 with the threads 4956 on the cylindrical closing tube 4950 threaded onto or snap fit onto mating threads 4819 on the threaded vertical wall 4803 of the dispensing nozzle 4815 so that the spray nozzle 4500 is closed by the interior surface 4806 of the sealing cap transverse wall 4910. Rotating of the sealing cap 4900 causes the first locking tooth 4700 to engage the cavity 4814A of said first standoff 4800A and causes the second locking tooth 4801 to engage the cavity 4814B of the second standoff 800B.

Therefore, a simultaneous inward pressure on the exterior surface 4922 of the circumferential sidewall 4920 of the sealing cap 4900 at locations adjacent to the first locking tooth 4700 and the second locking tooth 4801 disengages said first locking tooth 4700 from said first cavity 4814A of said first standoff 4800A and disengage the second locking tooth 4801 from the second cavity 4814B of said second standoff 4800B. A reverse rotation of the sealing cap unthreads the cylindrical closing tube 4950 from the centrally located dispensing nozzle 4815.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus comprising:
   (a) a sealing cap including:
      (i) a transverse top wall having an exterior surface and an interior surface, the transverse top wall integrally formed with an exterior circumferential sidewall having an exterior surface and an interior circumferential surface terminating in a circumferential bottom rim, the respective interior surface of said transverse top wall and said circumferential interior sidewall surrounding a sealing cap interior chamber with an open bottom, the sealing cap interior has a first interior diameter of the interior circumferential surface,
      (ii) a cylindrical closing tube having a cylindrical exterior wall affixed to said interior surface of said transverse top wall and having a cylindrical interior surface with a first set of mating threads therein, the cylindrical closing tube having a second diameter less than said first diameter and centered within said sealing cap chamber, a circumferential interior space between said cylindrical wall of said cylindrical closing tube and said interior surface of said cylindrical sidewall,
      (iii) a first locking tooth having a body with a top end affixed to said interior surface of said transverse top wall and a bottom end adjacent an interior of said circumferential bottom rim, the body of the first locking tooth affixed at an interior end to said interior surface of said circumferential sidewall and extending at an angle relative to said interior sidewall with an interior end of the first locking tooth within said cylindrical interior space of said interior chamber and spaced apart from said cylindrical exterior wall of said cylindrical closing tube;
      (iv) a second locking tooth having a body with a top end affixed to said interior surface of said transverse top wall and a bottom end adjacent an interior of said circumferential bottom rim, the body of the second locking tooth affixed at an interior end to said interior surface of said circumferential sidewall and extending at an angle relative to said interior sidewall with an interior end of the second locking tooth within said cylindrical interior space of said interior chamber and spaced apart from said cylindrical exterior wall of said cylindrical closing tube;
      (v) the first locking tooth and the second locking tooth affixed one-hundred and eighty degrees apart and extending at opposite angles relative to the circumferential interior sidewall;
   (b) a container including:
      (i) a closed rear end, an exterior sidewall and a transverse top wall surrounding an interior chamber,
      (ii) a centrally located dispensing nozzle integrally formed with said transverse top wall and having a threaded vertical wall with mating threads on the threaded vertical wall, the dispensing nozzle including a longitudinal interior shaft extending into transverse top wall and a distal central opening, the longitudinal interior shaft leading to said interior chamber, and
      (iii) the top wall of the container further including a first standoff affixed to the top wall of the container and located between the dispensing nozzle and a top circumferential edge of the front wall, the first standoff having a first body with a first cavity extending from a surface of the first body into the first body, an oppositely disposed second standoff affixed to the top wall of the container and located between the dispensing nozzle and a top circumferential edge of the front wall, the second standoff having a second body with a second cavity extending from a surface of the second body into the second body, the first standoff and the second standoff located on opposite sides of the dispensing nozzle;
   (c) the sealing cap removably affixed to the dispensing nozzle with the threads on the cylindrical closing tube threaded onto the mating threads on the threaded vertical wall of the dispensing nozzle so that the distal opening of the dispensing nozzle is closed by the interior surface of the sealing cap transverse wall and rotating of the sealing cap causes the first locking tooth to engage the cavity of said first stand off and the second locking tooth engages the cavity of the second standoff;
   (d) whereby, a simultaneous inward pressure on said exterior surface of said circumferential sidewall of said sealing cap at locations adjacent said first locking tooth and said second locking tooth disengages said first locking tooth from said cavity of said first standoff and disengage said second locking tooth from said second cavity of said second standoff, and a reverse rotation of the sealing cap unthreads the cylindrical closing tube from the dispensing nozzle.

2. The apparatus in accordance with claim 1, further comprising: said second circumferential sidewall of said container is formed in a shape selected from the group consisting of oval-shaped, elliptical-shaped and cylindrical-shaped.

3. The apparatus in accordance with claim 1, further comprising: said container sidewall is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

4. The apparatus in accordance with claim 1, further comprising said dispensing nozzle includes a rollerball dispenser within said longitudinal interior shaft adjacent its distal opening.

5. The apparatus in accordance with claim 4, further comprising: said second circumferential sidewall of said container is formed in a shape selected from the group consisting of oval-shaped, elliptical-shaped and cylindrical-shaped.

6. The apparatus in accordance with claim 4, further comprising: said container sidewall is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

7. An apparatus comprising:
   (a) a sealing cap including:
      (i) a transverse top wall having an exterior surface and an interior surface, the transverse top wall integrally formed with an exterior circumferential sidewall having an exterior surface and an interior circumferential surface terminating in a circumferential bottom rim, the respective interior surface of said transverse top wall and said circumferential interior sidewall surrounding a sealing cap interior chamber with an open bottom, a central longitudinal post having a proximal end integrally formed at a center of the interior surface of the top transverse wall which corresponds with the center of the sealing cap, the central longitudinal post includes an elongated shaft terminating at a distal end, the sealing cap interior has a first interior diameter of the interior circumferential surface,
      (ii) a cylindrical closing tube having a cylindrical exterior wall affixed to said interior surface of said transverse top wall and having a cylindrical interior surface with a first set of mating threads therein, the cylindrical closing tube having a second diameter less than said first diameter and centered within said sealing cap chamber, a circumferential interior space between said cylindrical wall of said cylindrical closing tube and said interior surface of said cylindrical sidewall,
      (iii) a first locking tooth having a body with a to affixed to said interior surface of said transverse top wall and a bottom end adjacent an interior of said circumferential bottom rim, the body of the first locking tooth affixed at an interior end to said interior surface of said circumferential sidewall and extending at an angle relative to said interior sidewall with an interior end of the first locking tooth within said cylindrical interior space of said interior chamber and spaced apart from said cylindrical exterior wall of said cylindrical closing tube;
      (iv) a second locking tooth having a body with a top end affixed to said interior surface of said transverse top wall and a bottom end adjacent an interior of said circumferential bottom rim, the body of the second locking tooth affixed at an interior end to said interior surface of said circumferential sidewall and extending at an angle relative to said interior sidewall with an interior end of the second locking tooth within said cylindrical interior space of said interior chamber and spaced apart from said cylindrical exterior wall of said cylindrical closing tube,
      (v) the first locking tooth and the second locking tooth affixed one-hundred and eighty degrees apart and extending at opposite angles relative to the circumferential interior sidewall;
   (b) a container including:
      (i) a closed rear end, an exterior sidewall and a transverse top wall surrounding an interior chamber,
      (ii) a centrally located dispensing nozzle integrally formed with said transverse top wall and having a threaded vertical wall with mating threads on the threaded vertical wall, the dispensing nozzle including a longitudinal interior shaft extending into transverse top wall and a distal central opening on a distal front surface, the longitudinal interior shaft leading to said interior chamber,
      (iii) a cylindrical sponge having a transverse proximal real surface, a cylindrical body and a transverse distal front surface, the transverse proximal rear surface of the cylindrical sponge affixed to the distal transverse front wall of the dispensing nozzle, the cylindrical sponge including an interior shaft extending from the distal front surface to the proximal rear surface and aligned with the proximal interior shaft of the dispensing nozzle,
      (iv) the top wall of the container further including a first standoff affixed to the top wall of the container and located between the dispensing nozzle and a top circumferential edge of the front wall the first standoff having a first body with a first cavity extending from a surface of the first body into the first body, an opposite second standoff affixed to the top wall of the container and located between the dispensing nozzle and a top circumferential edge of the front wall, the second standoff having a second body with a second cavity extending from a surface of the second body into the second body, the first standoff and the second standoff located on opposite sides of the dispensing nozzle;
   (c) the sealing cap removably affixed to the dispensing nozzle with the threads on the cylindrical closing tube threaded onto the mating threads on the threaded vertical wall of the dispensing nozzle so that the distal opening of the dispensing nozzle is closed by the interior surface of the sealing cap transverse wall and the central post of the sealing cap is also inserted through the aligned central shaft of the cylindrical sponge and the aligned central shaft of the dispensing nozzle to further seal the container and rotating of the sealing cap causes the first locking tooth to engage the cavity of said first standoff and the second locking tooth engages the cavity of the second standoff;

(d) whereby, a simultaneous inward pressure on said exterior surface of said circumferential sidewall of said sealing cap at locations adjacent said first locking tooth and said second locking tooth disengages said first locking tooth from said first cavity of said first standoff and disengage said second locking tooth from said second cavity of said second standoff and a reverse rotation of the sealing cap unthreads the cylindrical closing tube from the dispensing nozzle.

8. The apparatus in accordance with claim 7, further comprising: said second circumferential sidewall of said container is formed in a shape selected from the group consisting of oval-shaped, elliptical-shaped and cylindrical-shaped.

9. The apparatus in accordance with claim 7, further comprising: said container sidewall is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

10. An apparatus comprising:
(a) a sealing cap including:
(i) a transverse top wall having an exterior surface and an interior surface, the transverse top wall integrally formed with an exterior circumferential sidewall having an exterior surface and an interior circumferential surface terminating in a circumferential bottom rim, the respective interior surface of said transverse top wall and said circumferential interior sidewall surrounding a sealing cap interior chamber with an open bottom,
(ii) a cylindrical closing tube having a cylindrical exterior wall affixed to said interior surface of said transverse top wall and having a cylindrical interior surface with a first set of mating threads therein, the cylindrical closing tube having a second diameter less than said first diameter and centered within said sealing cap chamber, a circumferential interior space between said cylindrical wall of said cylindrical closing tube and said interior surface of said cylindrical sidewall,
(iii) a first locking tooth having a body with a transverse top end affixed to said interior surface of said transverse top wall and a bottom end adjacent an interior of said circumferential bottom rim, the body of the first locking tooth affixed at an interior end to said interior surface of said circumferential sidewall and extending at an angle relative to said interior sidewall with an interior end of the first locking tooth within said cylindrical interior space of said interior chamber and spaced apart from said cylindrical wall of said cylindrical closing tube,
(iv) a second locking tooth having a body with a top end affixed to said interior surface of said transverse top wall and a bottom end adjacent an interior of said circumferential bottom rim, the body of the second locking tooth affixed at an interior end to said interior surface of said circumferential sidewall and extending at an angle relative to said interior sidewall with an interior end of the second locking tooth within said cylindrical interior space of said interior chamber and spaced apart from said cylindrical exterior wall of said cylindrical closing tube,
(v) the first locking tooth and the second locking tooth affixed one-hundred and eighty degrees apart and extending at opposite angles relative to the circumferential interior sidewall;

(b) a container including:
(i) a closed rear end, an lower cylindrical exterior sidewall extending to a outwardly flared sidewall with an exterior surface with a multiplicity of spaced apart ribs and a flared interior surface,
(ii) a centrally located dispensing nozzle integrally formed with a central chamber with an exterior surface and a multiplicity of supporting spacer members between exterior surface and the flared interior surface,
(iii) a cylindrical sponge affixed to the centrally located dispensing nozzle and in fluid communication with contents within an interior chamber with said centrally located dispensing nozzle,
(iv) a first standoff affixed within the flared sidewalls and located between the centrally located dispensing nozzle and the flared interior surface, first standoff having a first body with a first cavity extending from a surface of the first body into the first body, an opposite second standoff affixed within the flared sidewalls and located between the centrally located dispensing nozzle and the flared interior surface, the second standoff having a second body with a second cavity extending from a surface of the second body into the second body, the first standoff and the second standoff located on opposite sides of the centrally located dispensing nozzle; and (c) the sealing cap removably affixed to the dispensing nozzle with the threads on the cylindrical closing tube threaded onto or snap fit onto mating threads on the threaded vertical wall of the dispensing nozzle so that the cylindrical sponge of the dispensing nozzle is closed by the interior surface of the sealing cap transverse wall and rotating of the sealing cap causes the first locking tooth to engage the cavity of said first standoff and the second locking tooth engages the cavity of the second standoff;

(d) whereby, a simultaneous inward pressure on said exterior surface of said circumferential sidewall of said sealing cap at locations adjacent said first locking tooth and said second locking tooth disengages said first locking tooth from said first cavity of said first standoff and disengage said second locking tooth from said second cavity of said second standoff, and a reverse rotation of the sealing cap unthreads the cylindrical closing tube from the centrally located dispensing nozzle.

11. The apparatus in accordance with claim 10, further comprising: said second circumferential sidewall of said container is formed in a shape selected from the group consisting of oval-shaped, elliptical-shaped and cylindrical-shaped.

12. The apparatus in accordance with claim 10, further comprising: said container sidewall is made of material selected from the group consisting of rolled laminated plastic and rolled laminated aluminum, each having one to eight least one layer of rolled laminated plastic or aluminum, the plastic is selected from the group consisting of polypropylene, polyethylene, polyvinyl, and combinations including one or more of said polypropylene, polyethylene, polyvinyl.

\* \* \* \* \*